United States Patent
Spodek et al.

(10) Patent No.: US 6,564,486 B1
(45) Date of Patent: May 20, 2003

(54) APPARATUS FOR DISPLAYING IMAGES TO VIEWERS IN MOTION

(75) Inventors: Joshua D. Spodek, New York, NY (US); Matthew H. Gross, New York, NY (US)

(73) Assignee: Submedia, LLC, New York, NY (US)

( * ) Notice: Subject to any disclaimer, the term of this patent is extended or adjusted under 35 U.S.C. 154(b) by 0 days.

(21) Appl. No.: 09/362,767

(22) Filed: Jul. 28, 1999

Related U.S. Application Data
(60) Provisional application No. 60/094,484, filed on Jul. 29, 1998, provisional application No. 60/127,164, filed on Mar. 26, 1999, and provisional application No. 60/134,747, filed on May 18, 1999.

(51) Int. Cl.[7] .............................................. G09F 19/14
(52) U.S. Cl. ......................................... 40/453; 352/100
(58) Field of Search ................... 40/453, 446; 352/100; 359/896

(56) References Cited

U.S. PATENT DOCUMENTS

| | | | |
|---|---|---|---|
| 742,632 A | * 10/1903 | Hadden | ....................... 350/100 |
| 917,587 A | 4/1909 | Good | |
| 1,006,769 A | * 10/1911 | Merrill | ....................... 350/100 |
| 2,026,753 A | 1/1936 | Rosenthal et al. | ............. 88/16 |
| 3,463,581 A | 8/1969 | Clay | |
| 4,383,742 A | 5/1983 | Brachet et al. | ............. 352/100 |

FOREIGN PATENT DOCUMENTS

| | | |
|---|---|---|
| CA | 2053364 | 4/1992 |
| CA | 2242807 | 7/1997 |
| CA | 2263661 | 1/1998 |
| DE | 298 20 186 | 4/2000 |
| EP | 393 2443 | 10/1990 |
| FR | 892874 | 5/1944 |
| FR | 1029300 | 6/1953 |
| FR | 1051712 | 1/1954 |
| GB | 17677 | 3/1903 |
| GB | 6776 | 7/1905 |
| GB | 106866 | 6/1917 |
| GB | 2 230 104 | 10/1990 |
| GB | 2 317 985 | 4/1998 |

* cited by examiner

Primary Examiner—Cassandra H. Davis
(74) Attorney, Agent, or Firm—Fish & Neave; Jeffrey H. Ingerman; Garry J. Tuma

(57) ABSTRACT

Apparatus for displaying still images to viewers in motion relative to those images, such as passengers on a subway train, includes a plurality of images mounted on a surface, and a slitboard mounted between that surface and the viewer. As the viewers pass by, the slitboard acts like a shutter, creating an animation effect. In addition, there is a stretching or widening effect that enlarges the images, allowing images to be "preshrunk," thereby allowing a large number of images in a small space, increasing the available frame rate of the animation. The stretching effect depends on the distance between the image surface and the slitboard.

23 Claims, 13 Drawing Sheets

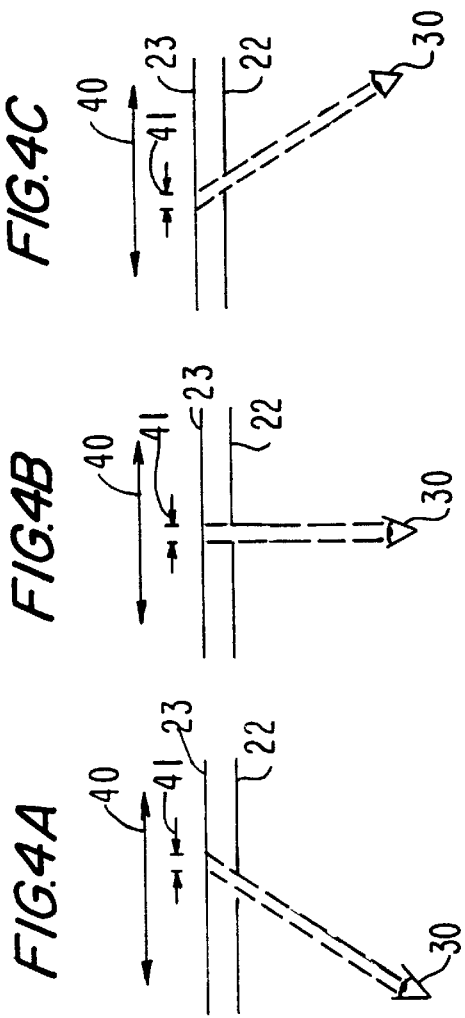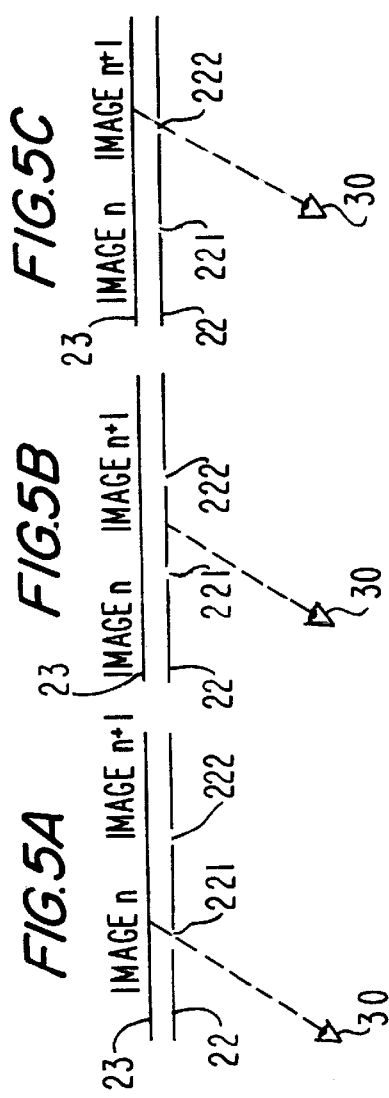

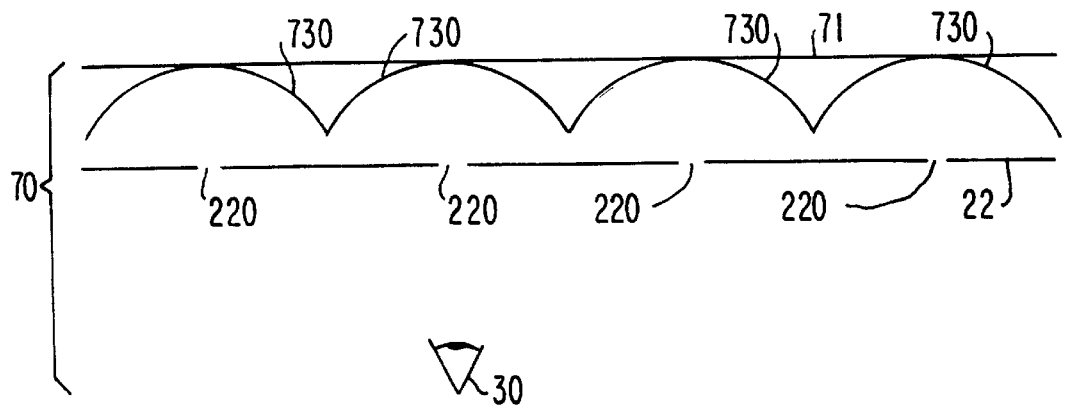
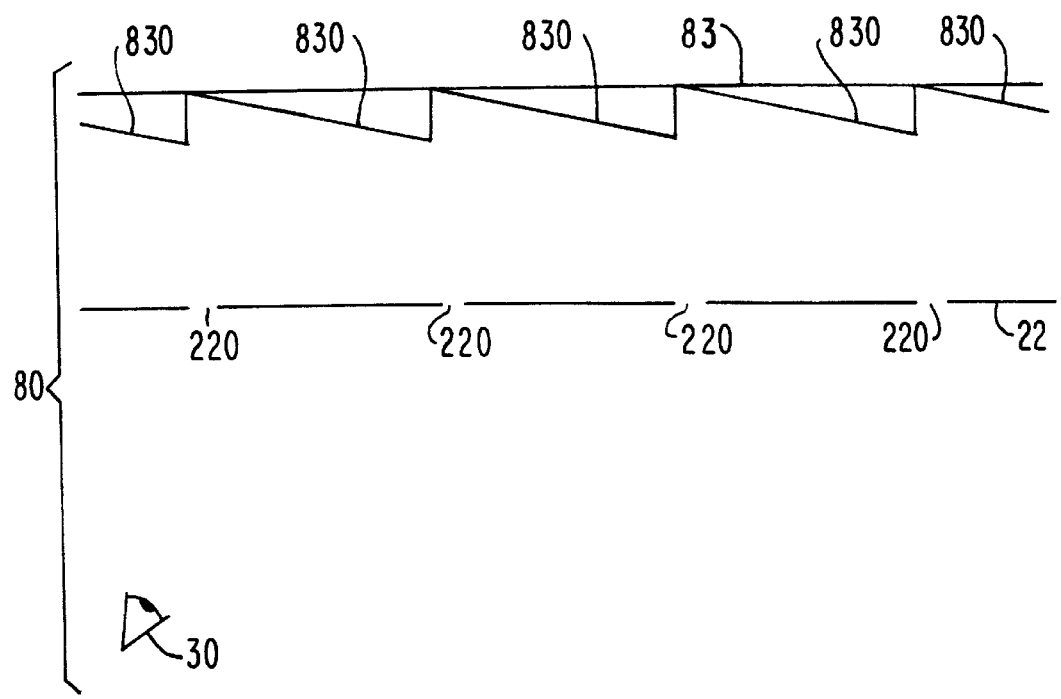

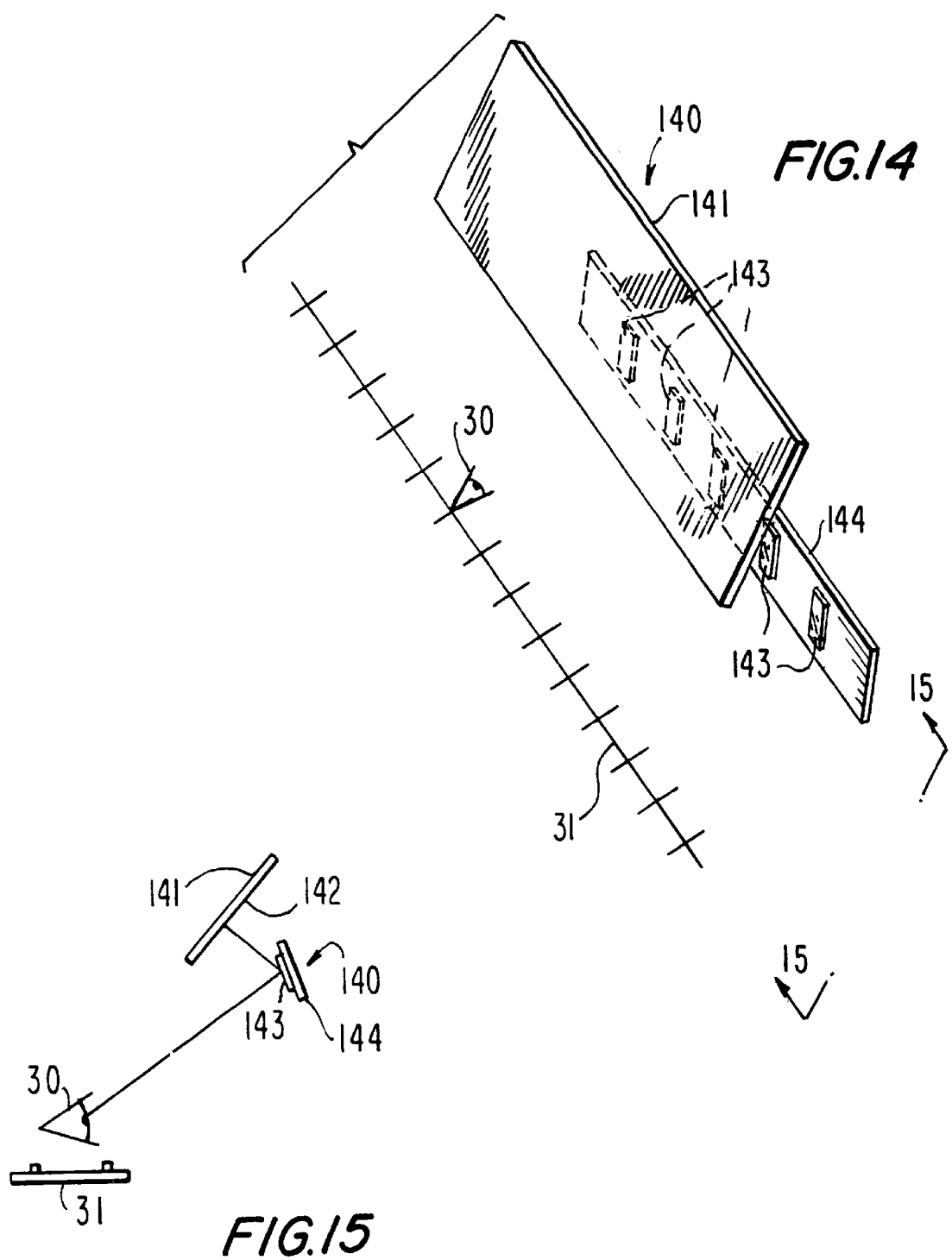

US 6,564,486 B1

APPARATUS FOR DISPLAYING IMAGES TO VIEWERS IN MOTION

CROSS REFERENCE TO RELATED APPLICATIONS

This claims the benefit of U.S. Provisional Patent Applications Nos. 60/094,484, 60/127,164, and 60/134,747, filed Jul. 29, 1998, Mar. 26, 1999, and May 18, 1999, respectively.

BACKGROUND OF THE INVENTION

This invention relates to the display of still images that appear animated to a viewer in motion relative to the still images. More particularly, this invention relates to the display of such still images in spatially-constrained environments.

Display devices that display still images appearing to be animated to a viewer in motion are known. These devices include a series of graduated images (i.e., adjacent images that differ slightly and progressively from one to the next). The images are arranged in the direction of motion of a viewer (e.g., along a railroad) such that the images are viewed consecutively. As a viewer moves past these images, they appear animated. The effect is similar to that of a flip-book. A flip-book has an image on each page that differs slightly from the one before it and the one after it such that when the pages are flipped, a viewer perceives animation.

A longstanding trend in mass transportation systems has been the development of installations to provide the passengers in subway systems with animated motion pictures. The animation of these motion pictures is effected by the motion of the viewer relative to the installation, which is fixed to the tunnel walls of the subway system. Such installations have obvious value: the moving picture is viewable through the train windows, through which only darkness would otherwise be visible. Possible useful moving picture subjects could be selections of artistic value, or informative messages from the transportation system or from an advertiser.

Each of the known arrangements provides for the presentation of a series of graduated images, or "frames," to the viewer/rider so that consecutive frames are viewed one after the other. As is well known, the simple presentation of a series of still images to a moving viewer is perceived as nothing more than a blur if displayed too close to the viewer at a fast rate. Alternatively, at a large distance or low speeds, the viewer sees a series of individual images with no animation. In order to achieve a motion picture effect, known arrangements have introduced methods of displaying each image for extremely short periods of time. With display times of sufficiently short duration, the relative motion between viewer and image is effectively arrested, and blurring is negligible. Methods for arresting the motion have been based on stroboscopic illumination of the images. These methods require precise synchronization between the viewer and the installation in order that each image is illuminated at the same position relative to the viewer, even as the viewer moves at high speed.

The requirements of a stroboscopic device are numerous: the flash must be extremely brief for a fast moving viewer, and therefore correspondingly bright in order that enough light reach the viewer. This requirement, in turn, requires extremely precisely timed flashes. This precision requires extremely consistent motion on the part of the viewer, with little or no change in speed. All of the aforementioned requirements result in a high level of mechanical or electrical complexity and cost, or greater consistency in train motion than exists. Other known arrangements have overcome the need for high temporal precision by providing a transponder of some sort on the viewer's vehicle and a receiver on the installation to determine the viewer's position. These arrangements involve considerable mechanical and electrical complexity and cost.

The aforementioned known arrangements generally require the viewer to be in a vehicle. This requirement may be imposed because the vehicle carries equipment for timing, lighting, or signalling; or because of the need to maintain high consistency in speed; or to increase the viewer's speed, for example. The use of a vehicle requires a high level of complexity of the design because of the number of mechanical elements and because one frequently is dealing with existing systems, requiring modification of existing equipment. The harsh environment of being mounted on a moving subway car may limit the mechanical or electrical precision attainable in any unit that requires it, or it may require frequent maintenance for a part where high precision has been attained.

The use of a vehicle also imposes constraints. At the most basic level, it limits the range of possible applications to those where viewers are on vehicles. More specifically, considerations of the vehicle's physical dimensions constrain a stroboscopic device's applicability. The design must take into account such information as the vehicle's eight and width, its window size and spacing, and the positions of viewers within the vehicle. For example, close spacing of windows on a high speed train requires that stroboscopic discharges preferably be of high frequency and number in order that the display be visible to all occupants of a train. The dimensions of the environment, such as the physical space available for hardware installation in the subway tunnel and the distances available over which to project images, impose further constraints on the size of elements of any device as well as on the quality and durability of its various parts.

Though in principle a stroboscopic device can work for slowly moving viewers, simply by spacing the projectors more closely, in practice it is difficult. First, closer spacing increases cost and complexity. Also, once the device is installed with a fixed projector-to-projector distance, a minimum speed is imposed on the viewer.

An existing method for the display of animated images involving relative motion between the viewer and the device is the zootrope. The zootrope is a simple hollow cylindrical device that produces animation by way of the geometrical arrangement of slits cut in the cylinder walls and a series of graduated images placed on the inside of the cylinder, one per slit. When the cylinder is spun on its axis, the animation is visible through the (now quickly moving) slits.

The zootrope is, however, fixed in nearly all its proportions because its cross section must be circular. Since the animation requires a minimum frame rate, and the frame rate depends on the rotational speed, only a very short animation can be viewed using a zootrope. Although there is relative motion between the viewer and the apparatus, in practice the viewer cannot comfortably move in a circle around the zootrope. Therefore only one configuration is practicable with a zootrope: that in which a stationary viewer observes a short animation through a rotating cylinder.

For the reasons of its incapacity to be altered in shape, the short duration of its animation, and the fact that it must be spun, the zootrope has remained a toy or curiosity without practical application. However, at least one known system displays images along an outdoor railroad track in an arrangement that might be referred to as a "linear zootrope" in which the images are mounted behind a wall in which slits are provided. That outdoor environment is essentially unconstrained.

In view of the foregoing, it would be desirable to be able to provide apparatus for use in a spatially-constrained environment that displays still images that appear animated to a viewer in motion.

It would also be desirable to be able to provide such apparatus for use in a spatially-constrained environment having low ambient lighting levels.

SUMMARY OF TE INVENTION

It is an object of this invention to attempt to provide apparatus for use in a spatially-constrained environment that displays still images that appear animated to a viewer in motion.

It is also an object of this invention to attempt to provide such apparatus for use in a spatially-constrained environment having low ambient lighting levels.

In accordance with this invention, there is provided apparatus for displaying a plurality of still images, forming an animated display, to a viewer moving substantially at a known velocity relative to said still images substantially along a known trajectory substantially parallel to said still images. The apparatus includes a backboard having a backboard length along the trajectory. The still images are mounted on a surface of the backboard, with each of said still images having an actual image width and having an image center. Image centers of adjacent images are separated by a frame-to-frame distance. A slitboard is positioned substantially parallel to the backboard, facing said surface thereof and separated therefrom by a board-to-board distance. The slitboard is mounted at a viewing distance from the trajectory. The board-to-board distance and the viewing distance total a backboard distance. The slitboard has a slitboard length along the trajectory, and has a plurality of slits substantially perpendicular to the slitboard length. Each slit corresponds to one of the images and has a slit width measured along the slitboard length and a slit center, respective slit centers of adjacent ones of the slits being separated by the frame-to-frame distance. In order to display each image with an apparent image width, the board-to-board distance, the viewing distance and the actual image width are selected so that the product of (a) the actual image width and (b) the quotient of (i) the viewing distance and (ii) the board-to-board distance substantially equals the apparent image width. In order to project each image substantially without blurring, the slit width is selected to be at most about one-tenth of the actual image width.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIGS. 4A, 4B and 4C (collectively "FIG. 4") are schematic representations of a single image and slit with a viewer at three different positions at three different instants of time;

FIGS. 5A, 5B and 5C (collectively "FIG. 5") are schematic representations of a pair of images and slits with a viewer at three different positions at three different instants of time;

FIG. 7 is a schematic plan view of a second preferred embodiment of the invention wherein the images are curved;

FIG. 8 is a schematic plan view of a third preferred embodiment of the invention wherein the images are inclined relative to the backboard;

FIG. 14 is a perspective view of an eighth preferred embodiment of the invention;

FIG. 15 is a vertical cross-sectional view, taken from line 15—15 of FIG. 14, of the eighth preferred embodiment of the invention.

DETAILED DESCRIPTION OF THE INVENTION

Figure 1:
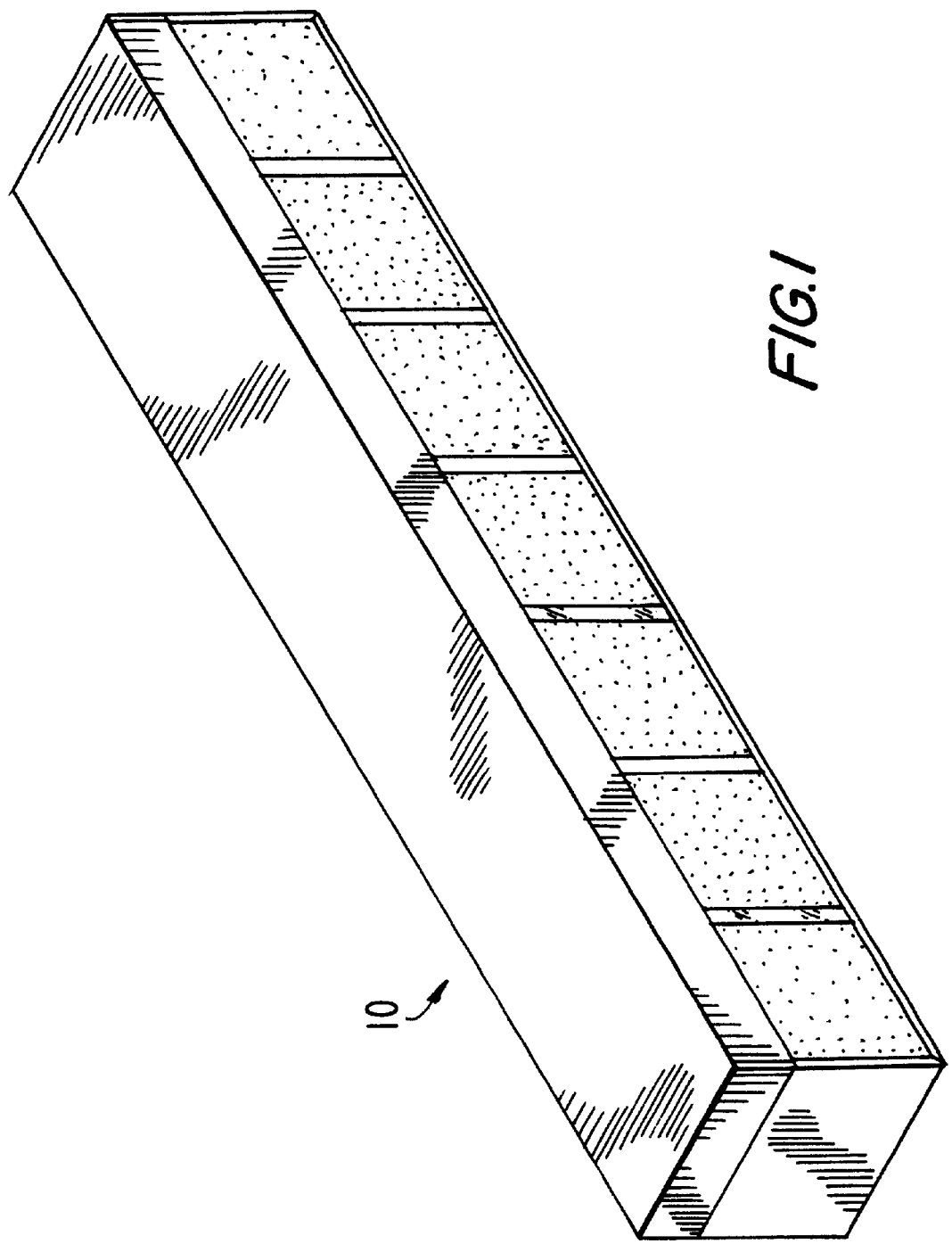
FIG. 1 is a perspective view of a preferred embodiment of apparatus according to the present invention.

It is the purpose of the present invention to produce a simple apparatus operating on principles of simple geometric optics that displays animation to a viewer in motion relative to it. The apparatus requires substantially only that the viewer move in a substantially predictable path at a substantially predictable speed. There are many common instances that meet this criterion, including, but not limited to, riders on subway trains, pedestrian on walkways or sidewalks, passengers on surface trains, passengers in motor vehicles, passengers in elevators, and so on. For the remainder of this document, for ease of description, reference will primarily be made to a particular exemplary application—an installation in a subway system, viewable by the riders on a subway train—but the present invention is not limited to such an application.

Benefits of the present invention include the following:

1. It preferably does not require that the viewer be in a vehicle.

2. It preferably obviates the need for complex stroboscopic illumination.
3. It preferably obviates the need for precise timing or positioning triggers between the apparatus and the viewer.
4. It preferably obviates the need for moving parts.
5. It preferably requires no shutter.
6. It preferably requires no special equipment to be mounted on the viewer or the viewer's vehicle, if the viewer is on a vehicle.
7. It preferably requires no transfer of information between the apparatus and the viewer pertaining to the viewer's. position, speed or direction of motion.
8. It preferably offers very high depth of field of viewability.
9. It preferably operates as designed independently of the direction of the viewer's motion.
10. It preferably is effective for each member of a closely spaced series of viewers, independent of their spacing or relative motions.
11. It preferably requires no optics more precise than a simple slit (although other optics may be used).
12. It preferably requires no correlation between vehicle window spacing and picture spacing.
13. It preferably offers the possibility of effective magnification of the image in the direction of motion.
14. It preferably requires very low minimum viewer speed due to the fact that the magnification allows very close spacing of graduated images.
15. It preferably does not require a particular geometry, be it circular, linear, or any other geometry.
16. It preferably has no maximum speed.

The apparatus preferably includes a series of graduated pictures ("images" or "frames") spaced at preferably regular intervals and, preferably between the pictures and the viewer, an optical arrangement that preferably restricts the viewer's view to a thin strip of each picture. This optical arrangement preferably is an opaque material with a series of thin, transparent slits in it—one slit per picture—oriented with the long dimension of the slit perpendicular to the direction of the viewer's motion. The series of pictures will generally be called a "backboard" and the preferred optical arrangement will generally be called a "slitboard."

Not essential to the invention, but often desirable, is a source of illumination so that the pictures are brighter than the viewer's environment. The illumination can back-light the pictures or can be placed between the slitboard and backboard to front-light the pictures substantially without illuminating the viewer's environment. When lighting is used it preferably should be constant in brightness. Natural or ambient light can be used. If ambient light is sufficient, the apparatus can be operated without any built-in source of illumination.

Also not necessary, but often desirable, is to make the viewer side of the slitboard dark or nonreflecting, or both, in order to maximize the contrast between the pictures viewable through the slitboard and the slitboard itself. However, the slitboard need not necessarily be dark or nonreflective. For example, the viewer face of the slitboard could have a conventional billboard placed on it with slits cut at the desired positions. This configuration is particularly useful in places where some viewers are moving relative to the device and others are stationary. This may occur, for example, at a subway station where an express train passes through without stopping, but passengers waiting for a local train stand on the platform. The moving viewers preferably will see the animation through the imperceptible blur of the conventional billboard on the slitboard front. The stationary viewers preferably will see only the conventional billboard.

The invention will now be described with reference to FIGS. 1–16.

Figure 2:
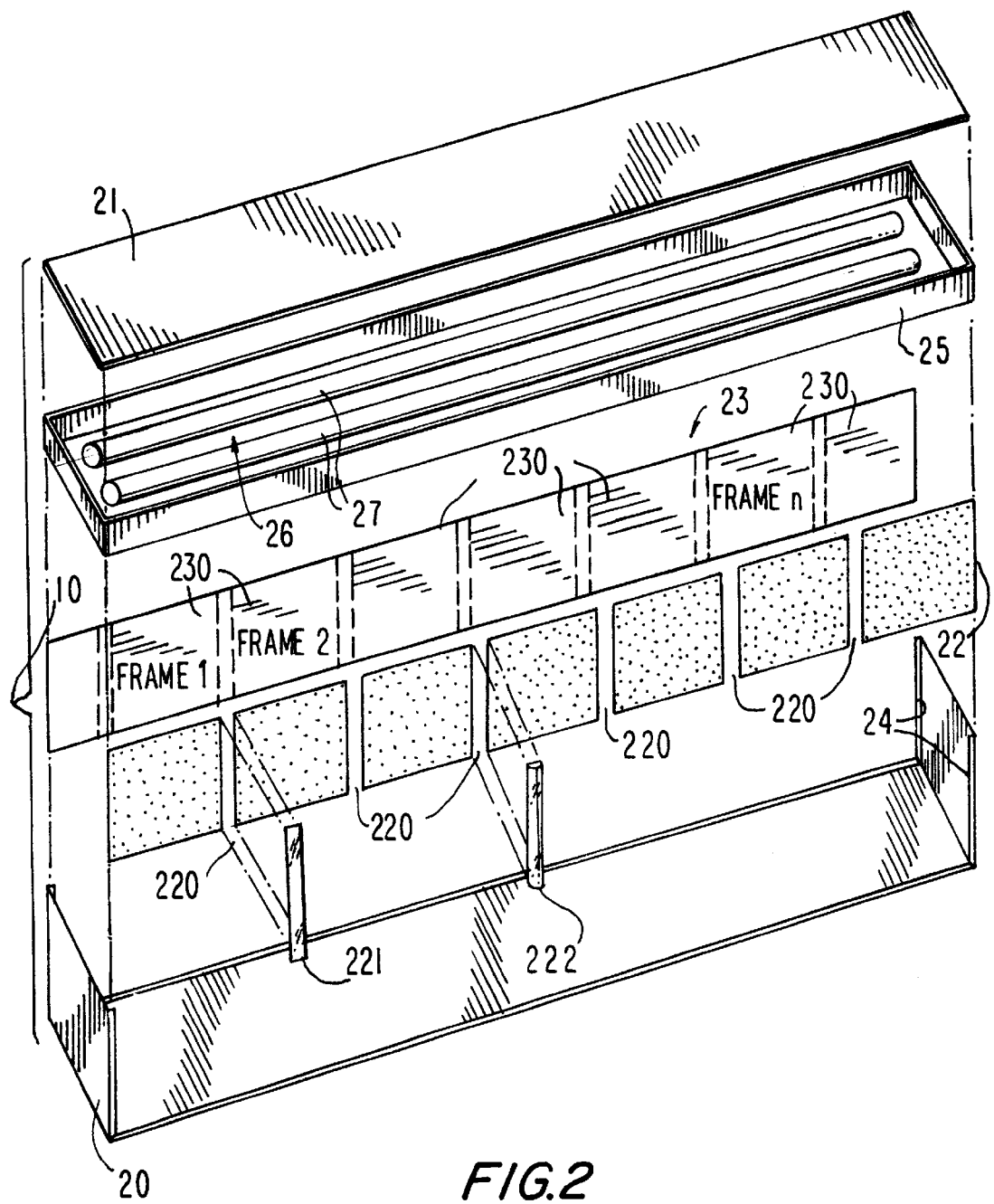
FIG. 2 is an exploded perspective view of the apparatus of FIG. 1.

The basic construction of a preferred embodiment of a display apparatus 10 according to the present invention is shown in FIGS. 1 and 2. In this embodiment, apparatus 10 is essentially a rectangular solid formed by housing 20 and lid 21. The front and rear of apparatus 10 preferably are formed by slitboard 22 and backboard 23, which are described in more detail below. Slitboard 22 and backboard 23 preferably fit into slots 24 in housing 20 which are provided for that purpose. Lightframe 25 preferably is interposed between housing 20 and lid 21 and preferably encloses light source 26, which preferably includes two fluorescent tubes 27, to light images, or "frames" 230, on backboard 23. Slitboard 22 preferably includes a plurality of slits 220 as described in more detail below. Preferably, in order to keep foreign matter out of apparatus 10, particularly if it is to be used in a harsh or dirty environment such as a subway tunnel, each slit 220 is covered by a light-transmissive, preferably transparent cover 221 (only one shown). Alternatively, each slit 220 may be covered by a semicylindrical lens 222 (only one shown), which also improves the resolution of viewed images. Specifically, if the focal length of the lens is approximately equal to the distance between slitboard 22 and backboard 23, the resolution of the image may be increased. This improvement of the resolution is effected by narrowing the width of the sliver of the actual image visible at a given instant by the viewer. Alternatively, the use of lenses may allow the slit width to be increased without lowering resolution.

Figure 2A:
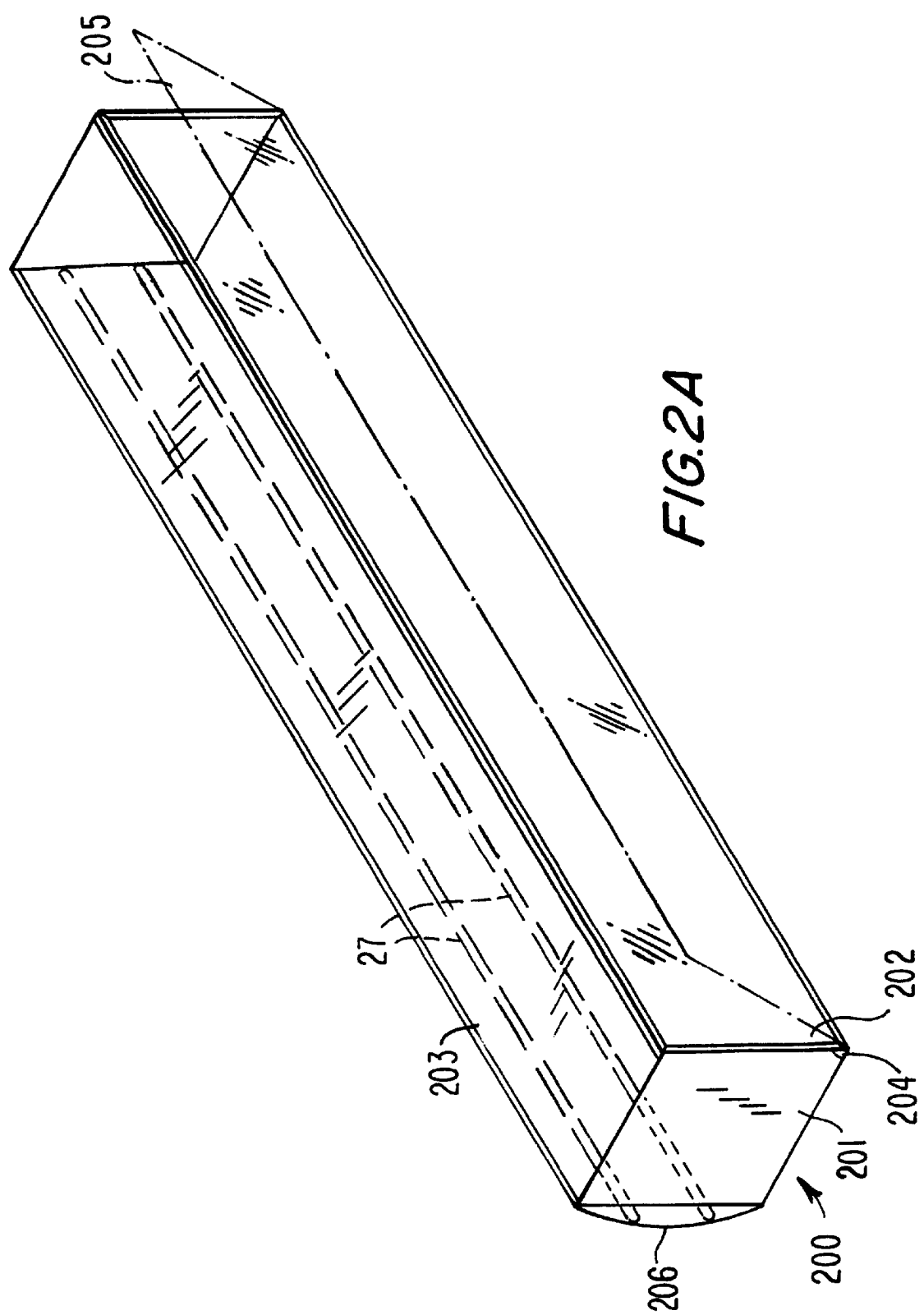
FIG. 2A is a perspective view of an alternative preferred embodiment of the apparatus of FIGS. 1 and 2.

In an alternative embodiment 200, shown in FIG. 2A, housing 201 is similar to housing 20, except that it includes light-transmissive, preferably transparent, front and rear walls 202, 203 respectively, forming a completely enclosed structure. At least one of walls 202, 203 (as shown, it is wall 202) preferably is hinged as at 204 to form a maintenance door 205 which may be opened, e.g., to replace backboard 23 (to change the images 230 thereon) or to change light bulbs 27). As shown in FIG. 2A, light bulbs 27 are provided in a backlight unit 206 instead of lightframe 25, necessitating that backboard 23 and images 230 be light-transmissive. Of course, embodiment 200 could be used with lightframe 25 instead of backlight unit 206. Similarly, apparatus 10 could be provided with backlight unit 206 instead of lightframe 25, in which case backboard 23 and images 230 would be light-transmissive.

Figure 3A:
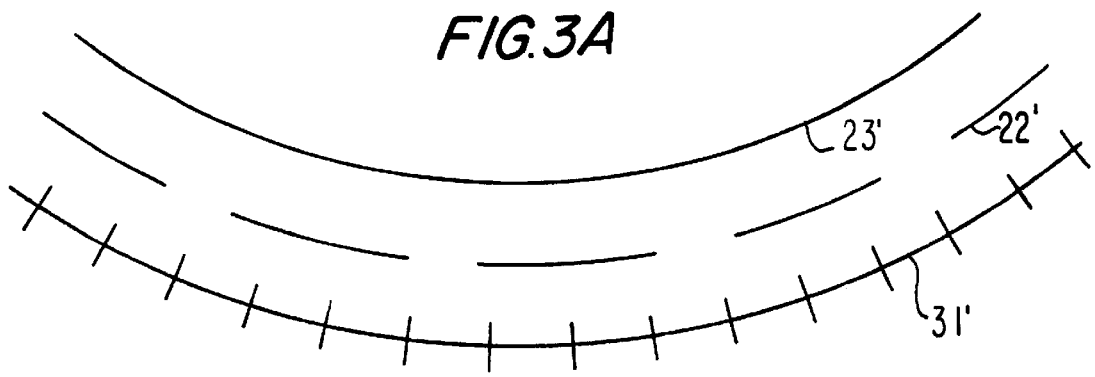
FIG. 3A is a schematic diagram of the geometry of a curved embodiment of the invention.
Figure 3:
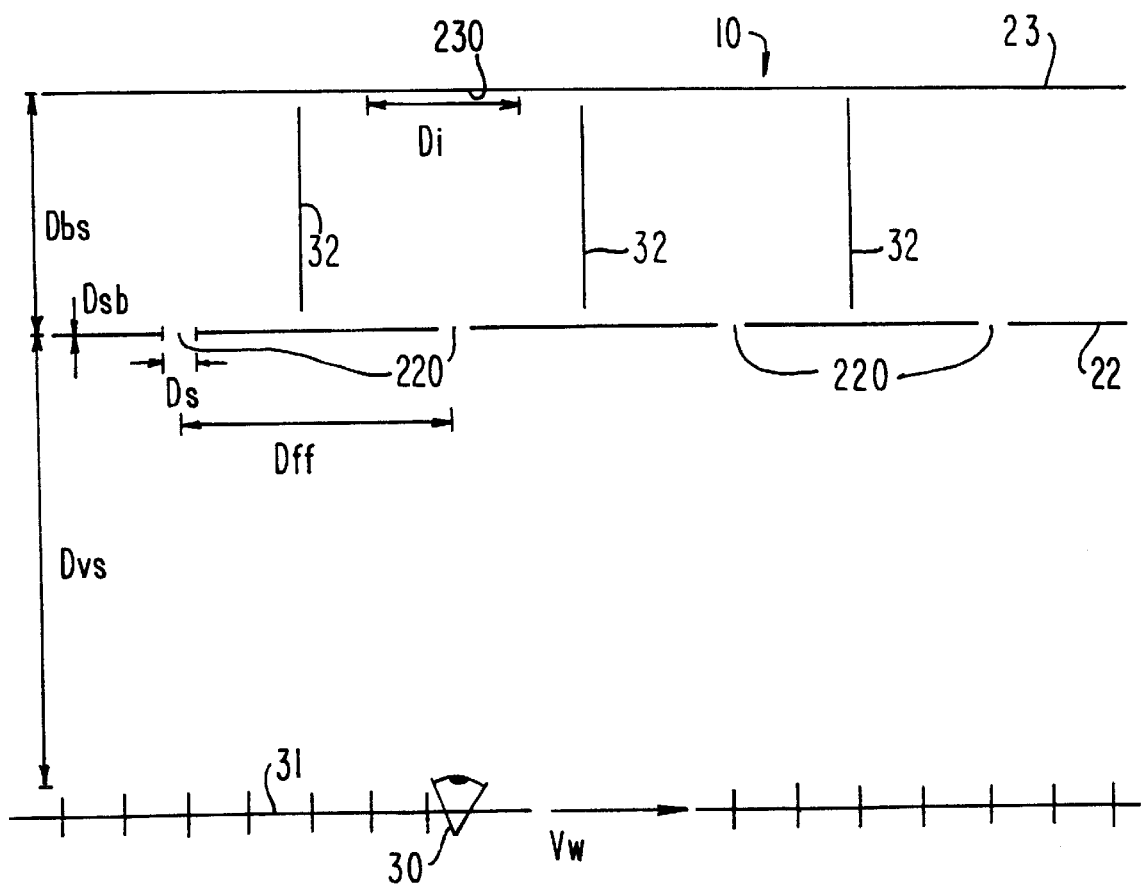
FIG. 3 is a schematic diagram of the geometry and optics of the apparatus of FIGS. 1 and 2.

FIG. 3 is a schematic plan view of a portion of apparatus 10 being observed by a viewer 30 moving at a substantially constant velocity $V_w$ along a track 31 substantially parallel to apparatus 10. Track 31 is drawn as a schematic representation of a railroad track, but may be any known trajectory such as a highway, or a walkway or sidewalk, on which viewers move substantially at a known substantially constant velocity.

The following variables may be defined from FIG. 3:

$D_s$=slit width
$D_{ff}$=frame-to-frame distance
$D_{bs}$=backboard-to-slitboard distance
$V_w$=speed of viewer relative to apparatus
$D_{sb}$=thickness of slitboard
$D_i$=actual width of a single image frame
$D_{vs}$=distance from viewer to slitboard Other parameters, which are not labelled, will be described below, including B (brightness), c (contrast), and $D_i'$ (apparent or perceived width of a single image frame).

An alternative geometry is shown in FIG. 3A, where track 31' is curved, and slitboard 22' and backboard 23' are correspondingly curved, so that all three are substantially "parallel" to one another. Although not labelled in FIG. 3A, the other parameters are the same as in FIG. 3, except that, depending on the degree of curvature, there may be some adjustment in the amount of stretching or enlargement of the image as discussed below.

One of the most significant departures of the present invention from previously known apparatus designed to be viewed from a moving vehicle is that no attempt is made to arrest the apparent motion of the image. That is, in the present device the image is always in motion relative to the viewer, and some part of the image is always viewable by the viewer. This contrasts with known systems for moving viewers where a stroboscopic flash is designed to be as close as instantaneous as possible in order to achieve an apparent cessation of motion of an individual image frame, despite its true motion relative to the viewer.

As with all animation, the apparatus according to the invention relies on the well known effect of persistence of vision, whereby a viewer perceives a continuous moving image when shown a series of discrete images. The operation of the invention uses two distinct, but simultaneous, manifestations of persistence of vision. The first occurs in the eye reconstructing a full coherent image, apparently entirely visible at once, when actually shown a small sliver of the image that sweeps over the whole image. The second is the usual effect of the flip-book, whereby a series of graduated images is perceived to be a continuous animation.

FIG. 4 illustrates the first persistence of vision effect. It shows the position of viewer 30 relative to one image at successive points (FIGS. 4A, 4B, 4C) in time. In each of FIGS. 4A, 4B and 4C, double-ended arrow 40 represents the total actual image width, $D_i$, while distance 41 represent's the portion of the image visible at a given time. This diagram shows that viewer 30, over a short period of time, gets to see each part of the image. However, at any given instant only a thin sliver of the picture, of width 41, is visible. Because the period of time over which the sliver is visible is very short, and therefore the motion of the image viewed through the slit in that time is very small, the viewer perceives very little or no blur, even at very high speeds. There is no theoretical upper limit on the speed at which the apparatus works—the faster the viewer moves, the less time a given sliver is visible. That is, the effect that would cause blur—the viewer's increased speed—is cancelled by effect that reduces blur—the period of viewability of a given sliver.

In FIG. 4 the representation of movement of the viewer's eye is purely illustrative. In practice the viewer's gaze is fixed at a screen that is perceived to be stationary, and the entirety of the frame can be seen through peripheral vision, as with a conventional billboard.

FIG. 5 illustrates the second persistence of vision effect. It shows viewer 30 looking in a fixed direction at three successive points in time. In FIG. 5A, a thin sliver of a first image n is in the direct line of the viewer's gaze through slit 221. In FIG. 5B, the viewer's direct gaze falls on a blocking part of slitboard 22. For the duration that the opaque part of slitboard 22 is in the line of the viewer's direct gaze, the viewer continues to perceive the sliver of image n just seen through slit 221. In FIG. 5C, the direct line of the viewer's gaze falls on slit 222, adjacent to slit 221, and viewer 30 sees a sliver of adjacent image n+1. Because each slit 221, 222 preferably is substantially perfectly aligned with its respective image, the slivers visible at a given angle in the two separate slots preferably correspond substantially precisely. That is, at a position, say, three inches from the left edge of the picture, the sliver three inches from the left edge of the picture is viewable from one frame to the next, and never a sliver from any other part of the image. In this way, the alignment between the slit and the image prevents the confusion and blur perceived by the viewer that otherwise would be caused by the fast motion of the images. Because successive frames differ slightly as with successive images in conventional animations, the viewer perceives animation.

The two persistence of vision effects operate simultaneously in practice. Above a minimum threshold speed, viewer 30 perceives neither discrete images nor discrete slivers.

Figure 6:
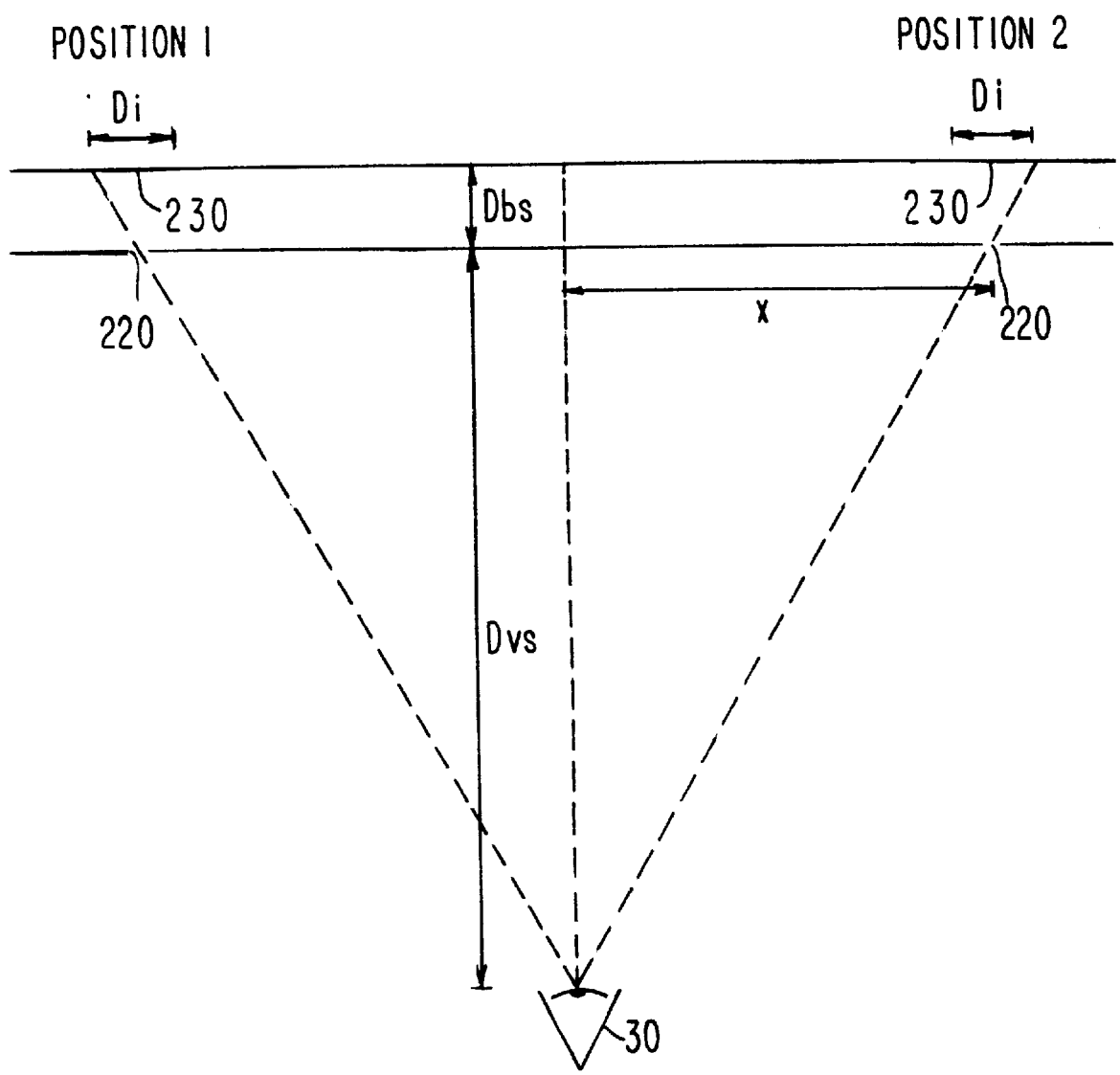
FIG. 6 is a schematic representation of a single image being viewed by a viewer over time, illustrating the stretching effect.

A very useful effect of apparatus 10 is the apparent stretching, or widening, of the image in the direction of motion. FIG. 6 illustrates the geometrical considerations explaining this stretching effect. Labelled "Position 1" and "Position 2" are the two positions of a given frame 230 where the opposite edges of frame 230 are visible. Because the positions of frame 230 and slit 220 are fixed relative to each other, they precisely determine the angle at which viewer 30 must look in order that slit 220 be aligned with an edge of the image 230.

At Position 1, the left edge of image 230 is aligned with slit 220 and the viewer's eye. At Position 2, the right edge of image 230 is aligned with slit 220 and the viewer's eye. In fact, the two positions occur at different times, but, as explained above, this is not observed by the viewer 30. Only one full image is observed.

If x is the distance from the centerpoint between the two positions of slit 220 to either of the individual positions at Position 1 or Position 2, then the perceived width of the image, $D_i'$, is 2x. By similar triangles, $$D_{vs}/x = (D_{vs}+D_{bs})/(x+D_i/2)$$
$$x(D_{vs}+D_{bs}) = (x+D_i/2)D_{vs}$$
$$2x = (D_{vs}/D_{bs})D_i$$
$$D_i' = (D_{vs}/D_{bs})D_i \quad (1)$$

Thus the perceived width of the image, $D_i'$, is increased over the actual width of the image by a factor of the ratio of the viewer-slitboard distance to the slitboard-backboard distance.

Figure 6A:
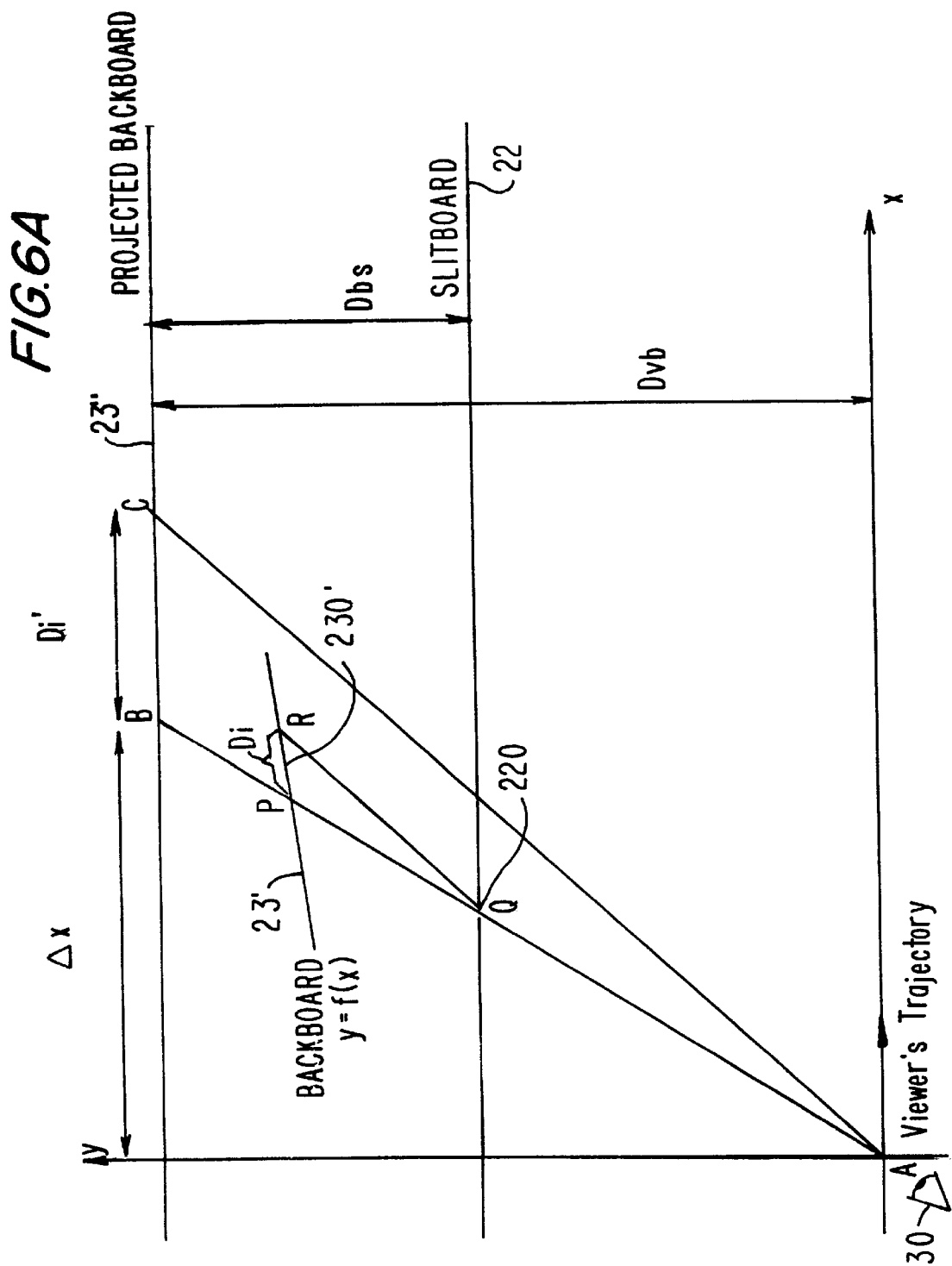
FIG. 6A is a schematic representation illustrating the stretching effect where the backboard is not parallel to the direction of motion.

FIG. 6A shows the magnification effect when the backboard 23' is not substantially parallel to the viewer's trajectory. The magnification is found by defining a formula f(x), where x is the distance along the viewer's trajectory, for the shape of the backboard—that is, the distance of the backboard from the axis defined by the viewer's trajectory—around each slit (for example, FIG. 7 shows a backboard 71 on which each image 730 forms a semicircle around its respective slit 220). For ease of convention, one can define an x axis along the direction of the viewer's motion and a y axis perpendicular to the x axis and choose the origin at the position of the viewer 30.

To find the magnification, one determines how an arbitrary picture element 230' on the backboard 23' will appear to viewer 30 on a projected flat backboard 23". In FIG. 6A, a section of the true backboard 23' is shown between slitboard 22 and the projected backboard 23". A length PR of the backboard 23' defines a picture element 230'. This section 230' will appear to viewer 30 as if on projected flat backboard 23", as indicated.

For ease of presentation, the section of backboard 23' shown is a straight line segment, but this linearity is not required. Also, the backboard shape does not need to be perfectly described by a formula y=f(x). In practice one can approximate the backboard's true shape in a number of ways—for example, by treating the backboard as a series of infinitesimal elements, each of which can be approximated by a line segment.

Viewer 30, at position A, sees the left edge P of picture element 230' when slit 220 is at Q. Because the positions of picture element 230' and slit 220 are fixed relative to each other, they precisely determine the angle at which viewer 30 must look in order that slit 220 be aligned with an edge of the element 230'. Therefore, the right edge R of this picture element 230' will be visible when the device has moved relative to viewer 30 to a position where a line parallel to QR passes through A.

The left edge of picture element 230' will appear on projected backboard 23" at position B, a distance Δx from the y axis. The right edge of picture element 230' will appear on projected backboard 23" at position C. The apparent width of the image, $D_i'$, is the distance BC.

Point P is the intersection of backboard 23' with the line through A and B.

Point Q is the intersection of slitboard 22 with the line through A and B.

Point R is the intersection of backboard 23' with the line through Q and R.

The distance $D_i$ is the distance from P to R.

The coordinates of the point P, $(P_x,P_y)$, are the solution (x,y) to y=f(x) and $$y=(D_{vb}/\Delta x)x, \quad (A)$$

where the latter equation is the formula for the line through A and B.

The coordinates of point Q, $(Q_x,Q_y)$ are the solution (x,y) to $y=(D_{vb}/\Delta x)x$, and $$y=D_{bs}. \quad (B)$$

The coordinates of point R, $(R_x,R_y)$, are the solution (x,y) to y=f(x) and $$y-Q_y=((\Delta x+D_i')/D_{vb})(x-Q_x). \quad (C)$$

Finally, the size $D_i$ that picture element 230' should have in order that it stretch to size $D_i'$ is given by $$D_i=((R_x-P_x)^2+(R_y-P_y)^2)^{0.5}, \quad (D)$$

where the variables on the right hand side can all be found in terms of dimensions of the apparatus and Δx.

The above derivations demonstrate practical methods for determining the stretching effect in order to preshrink an image for either substantially parallel or nonparallel backboards. A useful rule of thumb which is true for either backboard configuration comes from the fact that angle BAC is equal to angle BQC—the angular size of the projected image as seen by the viewer is the same as the angular size of the actual image at the position of slit 220.

In order to preshrink an image, it can be divided into many elements, starting at Δx=0 and moving sequentially in either direction while incrementing Δx appropriately. Then each element can be preshrunk and placed at the appropriate location on the backboard.

In cases where the viewer's trajectory is curved, such as the geometry shown in FIG. 3A, neither the slitboard nor the backboard will necessarily be a straight line. A similar derivation can be used to the one for nonparallel backboards, by defining an function g(x) for the path of the slit relative to the viewer and replacing Relation (B) with y=g(x).

In practice, the images may be shrunk in the direction of motion before being mounted on the backboard in order that when projected they are stretched to their proper proportions, allowing a large image to be presented in a relatively smaller space. Curved or inclined surfaces on the backboard can be used to augment the effect. That is, as a non-planar backboard approaches the slitboard, the magnification increases greatly. However, for simplicity, the discussion that follows will assume a planar backboard unless otherwise indicated.

As shown below, the stretching effect, when adjusted through the relevant variable parameters of apparatus 10, can be very useful. Also, the relation between the perceived image size, $D_i'$, and the viewer distance, $D_{vs}$, is linear—the image gets bigger as the viewer moves farther away. This can be a useful effect in the right environment.

There are some limitations and side effects. Both effects of persistence of vision require minimum speeds that are not necessarily equal. Too slow a speed can result in the appearance of only discrete vertical lines, or flicker, or a lack of observed animation effect. In practice, the appearance of only discrete vertical lines is the dominant limitation. A possibly useful effect of the stretching effect arises from the fact that slivers of multiple frames are. visible at the same time. That is, if the perceived image is ten times larger than the true image, slivers of ten different images may be visible at any given time. Because each frame presents a different point in time in the animation, multiple times of the image may be simultaneously viewable. This effect may, for example, be used to interlace images, if desired. similarly, multiple instances of a single frame can be displayed, in a manner similar to that used in commercial motion picture projection. Alternatively, the effect can also result in confusion or blur perceived by viewer 30. In practice this confusion is barely noticeable, however, and can be reduced through a higher frame rate or a slower varying subject of animation.

Another possibly useful effect occurs when the image of one frame 230 is visible through the slit 220 corresponding to an adjacent frame 230. In this case, multiple side-by-side animations may be visible to the viewer. These "second-order" images can be used for graphic effect, if desired. Or, if not desired, they may be removed by increasing slitboard thickness $D_{sb}$, or the ratio $D_{ff}/D_i$, by introducing a light baffle 32 between slitboard 22 and backboard 23, or by altering the geometry of backboard 23. All of these techniques are described below.

Still another possibly useful effect arises from the fact that the stretching effect distorts the proportions of image 230. One can remove this effect, if not desired, by preshrinking the images 230 so that the stretching effect restores the true proportions. Care must be taken, however, in the case where different viewers 30 observe apparatus. 10, each from a different $D_{vs}$. In this case, the exact restoration to perfect dimensions occurs at one $D_{vs}$ only. At another $D_{vs}$, the restoration is not exact. In practice, however, for many useful ranges of parameters, the improper proportions have few or no adverse effects.

In general, four parameters are imposed by the environment—$V_w$, $D_{bs}$, $D_{vs}$, and $D_i'$. $V_w$, the viewer's speed, is generally imposed by, e.g., the speed of the vehicle, typical viewer footspeed, or the speed of a moving walkway, escalator, etc. $D_{bs}$, the. backboard-to-slitboard distance, is generally limited by the space between a train and the tunnel wall, or the available space of a pedestrian walkway, for example. $D_{vs}$, the distance from viewer to slitboard, is imposed by, for example, the width of a subway car or the width of a pedestrian walkway. Finally, $D_i'$, the perceived image width, should be no larger than the area visible to viewer 30 at a given instant—for example, the width of a train window.

Also generally imposed is the well-established minimum frame rate for the successful perception of the animation effect—viz., approximately 15–20 frames per second. The frame rate, the frame-to-frame distance, and viewer speed are related by $$\text{Frame rate}=V_w/D_{ff} \tag{2}$$

Because the frame rate must generally be greater than the minimum threshold, and $V_w$ is generally imposed by the environment, this relation sets a maximum $D_{ff}$.

For example, for a train moving at about 30 miles per hour (about 48 kilometers per hour), given a minimum frame rate of about 20 frames per second, the relation above determines that $D_{ff}$ can be as great as about 2 feet (about 67 cm).

Alternatively, the minimum $V_w$ is determined by the minimum $D_{ff}$ allowable by the image, which is constrained by the fact that $D_{ff}$ can be no smaller than $D_i$. The stretching effect theoretically allows $D_i$ to be lowered arbitrarily without lowering $D_i$, because $D_{bs}$ can, in principle, be lowered arbitrarily. In practice, however, $D_{bs}$ cannot be lowered arbitrarily, because very small values result in very different perceived image widths for each viewer 30 at a different $D_{vs}$. That is, at too small a $D_{bs}$, viewers on opposite sides of a train could see too markedly differently proportioned images. Moreover, small $D_{bs}$, resulting in high magnification, requires correspondingly high image quality or printing resolution.

If viewers at different distances $D_{vs}$ will observe apparatus 10, the closest ones (those with the smallest $D_{vs}$) generally determine the limits on $D_{bs}$.

Because images cannot overlap, $$D_i \leq D_{ff}. \tag{3}$$

If $D_i=D_{ff}$ and one can view second order images, they will appear to abut the first order image, slightly out of synchronization. The resulting appearance will be like that of multiple television sets next to each other and starting their programs at slightly different times. This effect may be used for graphic intent, or, if not desired, three variations in parameters can remove it.

First, one can decrease the ratio $D_i/D_{ff}$, effectively putting space between adjacent images. This change will send second order images away from the primary ones.

Second, one may increase slitboard thickness $D_{sb}$ so that second order images are obscured by the cutoff angle. That is, for any non-zero thickness of slitboard 22, there will be an angle through which if one looks one will not be able to see through the slits. As the thickness of slitboard 22 increases, this angle gets smaller, and can be seen to follow the relation $$D_{sb}/D_s \leq D_{bs}/(D_i/2) \tag{4}$$

This relation may alternatively be written $$D_{sb}/D_s \leq D_{vs}/(D_i'/2) \tag{5}$$

by substitution for $D_i'$ from Relation 1. This shows the limit on $D_{sb}$ imposed by the desired perceived image width.

The same effect as described in the preceding paragraph can be achieved by placing light baffle 32 between slitboard 22 and backboard 23, thereby obstructing the view of one image 230 through the slit 220 of an adjacent image 230.

Third, one can change the shape of the backboard, as illustrated in FIG. 7. In apparatus 70, backboard 71 bears curved images 730 so that second order images are not observed. The change in backboard shape will result in a slightly altered stretching effect. As before, this stretching effect can be undone by preshrinking the image in the direction of motion.

The embodiment illustrated in FIG. 7 has the potentially useful property not only of showing no second order images, but also of an arbitrarily wide first order image. This effect is related to, but distinct from, the stretching effect described above, which assumes a flat backboard geometry. The final observed width of the image is limited by the vignetting of the slitboard—the exact relation can be found by solving Relation 5 for $D_i'$. It can be observed from FIG. 7 that as the viewing angle becomes large, the viewer continues to observe through each given slit 220 only the image 730 corresponding to that slit 220. In the ideal limit of zero slitboard width, the leftmost sliver of the image is viewable when the viewer looks 90° to the left and the rightmost sliver is viewable when the viewer looks 90° to the right. The slivers in between are continuously viewable between these extreme angles. In other words, each image is observed as infinitely wide. (In FIG. 7, the curved image 730 does not quite reach the slitboard 22, in order to illustrate the maximum viewing angle allowed by the vignetting of a non-zero width slitboard. In principle, the curve of image 730 may reach the slitboard.)

A further relation is that the slit width must vary inversely with the light brightness—i.e., $D_s$ 1/B. In general, the device has higher resolution and less blur the smaller the slit width (analogously to how a pinhole camera has higher resolution with a smaller pinhole). Since smaller slits transmit less light, the brightness must increase with decreasing slit width in order that the same total amount of light reach viewer 30.

The width of slit 220 relative to the image width determines the amount of blur perceived by viewer 30 in the direction of motion. More specifically, the size of slit 220, projected from viewer 30 onto backboard 23, determines the scale over which the present device does not reduce blur. This length is set because the sliver of the image that can be seen through slit 220 at any given moment is in motion, and therefore blurred in the viewer's perception. The size of slit 220 relative to the image width should thus be as small as practicable if the highest resolution possible is desired. In the parameter ranges of the two examples below, slit widths would likely be under about 0.03125 inch (under about 0.8 mm).

The achievable brightness and resolution, and their relationship, can be quantified.

First, define the following additional parameters:

$L_{ambient}$=the ambient luminance of the viewer's environment $L_{device}$=the luminance of the backboard on the apparatus c=the contrast between the image and the ambient environment at the position of the viewer $D_{vb}=D_{vs}+D_{bs}$=the distance between the viewer and the backboard $B_{ambient}$=the brightness of the ambient environment at the position of the viewer $B_{device}$=the brightness of the image at the position of the viewer TF=the transmission fraction, or fraction of light that passes through the slitboard R=the image resolution $L_{ambient}$ describes the luminance of a typical object within the field of view of the viewer while looking at the image projected by the apparatus. This typical object should be representative of the general brightness of the viewer's environment and should characterize the background light level. For example, in a subway or train it might be the wall of the car adjacent to the window through which the apparatus is viewable.

$B_{ambient}$ is the brightness of that object as seen by the viewer, and $$B_{ambient} = L_{ambient}/4\pi D_{ambient}^2, \qquad (6)$$

where $D_{ambient}$ is the distance between the viewer and the ambient object. It is sometimes difficult to select a particular object as representative of the ambient. As discussed above, in an embodiment used in a subway tunnel, the ambient object could be the wall of the subway car adjacent the window, in which case $D_{ambient}$ is the distance from the viewer to the wall. For ease of calculation, this may be approximated as $D_{vs}$ because the additional distance from the window to the apparatus is relatively small.

$L_{device}$ describes the luminance of the images on the backboard of the apparatus. Because the backboard is always viewed through the slitboard, which effectively filters the light passing through it, its brightness at the position of the viewer, $B_{device}$ is $$B_{device} = (L_{device}/4\pi D_{vb}^2) \times TF. \qquad (7)$$

TF, the transmission fraction of the slitboard, is the ratio of the length of slitboard transmitting light to the total length—i.e., $$TF = D_s/D_{ff} \leq (D_s \times D_{vs})/(D_i' \times D_{bs}), \qquad (8)$$

where equality holds in the second line when $D_{ff}=D_i$.

R, the image resolution, is the ratio of the size of the image to the size of the slit projected onto the backboard, $$R = (D_i \times D_{vs})/(D_s \times D_{bs}) \approx D_i'/D_s = (D_i' \times D_{bs})/(D_s \times D_{vs}) \qquad (9)$$

This quantity is called the resolution because the image tends to blur in the direction of motion on the scale of the width of the slit. Because the eye can see the whole area of the image contained within the slit width at the same time, and the image moves in the time it is visible, the eye cannot discern detail in the image much finer than the projected slit width. Therefore $D_s$ effectively defines the pixel size of the image in the direction of motion. In other words, for example, if the slit width is one tenth the width of the image, the image effectively has ten pixels in the direction of motion. In practice, the eye resolves the image to slightly better than R, but R determines the scale.

In order that the image meaningfully project a non-blurry image, R preferably is greater than 10, but this may depend on the image to be projected. It should also be noted that R=1/TF when $D_i=D_{ff}$, so that increasing the resolution decreases the transmitted light.

c is the contrast between the apparatus image and the ambient environment at the position of the viewer. In order that the image be viewable in the environment of the viewer, the apparatus brightness must be above a minimum brightness $$B_{device} \geq B_{ambient} \times c. \qquad (10)$$

In order that the device be visible at all, c defines a minimum device brightness that depends on the properties of the human eye: if the device's image is too dim relative to its environment it will be invisible. The brightness of the device may always be brighter than the minimum defined by c. Practically speaking, c ought to be at least about 0.1. For many applications, such as commercial advertising, it may be desirable that c be greater than 1.

The following parameters comprise the smallest set of parameters (which may be referred to as "independent" parameters) that fully describe the apparatus according to the invention—$D_{vs}$, $D_{bs}$, $V_w$, $L_{ambient}$, $D_{ambient}$, c, $L_{device}$, $D_i$, $D_s$, and $D_{ff}$. Other parameters, which may be defined as "dependent parameters" are:

$D_i' = D_i \times D_{vs}/D_{bs}$ $D_{vb} = D_{vs} + D_{bs}$ $R = D_i/D_s$ $FR = V_w/D_{ff}$ $TF = D_s/D_{ff}$ $B_{ambient} = L_{ambient}/4\pi D_{ambient}^2$ $B_{device} = (L_{device}/4\pi D_{vb}^2) \times TF$ Of the independent parameters, the first five are substantially determined by the environment in which the apparatus is installed. In a subway system, for example, these five parameters are determined by the cross sections of the tunnel and train, the train speed, and the lighting in the train. On a pedestrian walkway or building interior, as another example, these parameters are determined by the dimensions of the walkway or hallway, pedestrian foot speed, and the ambient lighting conditions.

c and the dependent parameters R and FR are constrained by properties of human perception, and that the image of the apparatus be meaningful and not overly degraded by blurring. $D_i'$ is constrained either by the environment (the width of a subway window, for example) or by the requirements of the image to be displayed by the apparatus (such as aesthetic considerations) or both. The remaining dependent parameters are determined by the independent parameters.

When these parameters are not substantially constrained, much greater leeway is allowed with the remaining four independent parameters, and the specific relationships set forth below need not be followed. Such relaxed conditions occur, for example, in connection with a surface train travelling outdoors in a flat environment when $D_{vs}$ is largely unconstrained. Sometimes a substantially unconstrained parameter results in an environment where the apparatus cannot be used at all, such as where the ambient light level varies greatly and randomly or the viewer speed is completely unknown.

The constraints on the remaining independent parameters are best expressed as a series of inequalities and are derived below.

Combining Relations 6, 7 and 10 provides the minimum slit width, $$D_s \geq c \times (B_{ambient}/B_{device})(D_{bs} \times D_i')/D_{vs} > c \times (L_{ambient}/L_{device})(D_{vb}^2/D_{ambient}^2)(D_{bs} \times D_i')/D_{vs} \qquad (11)$$

Solving Relation 9 for $D_s$ gives, $$D_s \leq (D_i' \times D_{bs})/(R \times D_{vs}). \qquad (12)$$

Combining Relations 11 and 12 constrains the slit width from above and below:

$$c \times (L_{ambient}/L_{device})(D_{vb}^2/D_{ambient}^2)(D_{bs} \times D_i')/D_{vs} \leq D_s \leq (D_i' \times D_{bs})/(R \times D_{vs}). \qquad (13)$$

In this relation, $L_{ambient}$ and all the distances except the slit width are substantially constrained by the environment, and R and c are constrained by properties of human visual perception. As discussed above, for ease of calculation, $D_{ambient}$ can be approximated by $D_{vs}$; note also that $(D_{bs} \times D_i')/D_{vs} = D_i$. The inequality between the far left and far right sides of the relation forces a minimum luminance for the apparatus, $L_{device}$. That is, if the luminance of the apparatus is below a minimum threshold, the apparatus image will be too dim to see in the brightness of the viewer's environment.

Once the luminance of the apparatus is sufficiently high, the inequalities between $D_s$, and the far left and far right of the relation determine the allowable slit width range. A smaller slit width gives higher resolution but less brightness and a greater slit width gives brightness at the expense of resolution. A higher luminance of the apparatus extends the lower end of the allowable slit width range.

Another similar relation for the frame-to-frame spacing may be derived from the relations above. Relation 3 may be written $$D_{ff} \geq D_i \geq (D_i' \times D_{bs})/D_{vs}. \tag{14}$$

Relation 2, frame rate=$V_w/D_{ff}$, may be rewritten $$D_{ff} \leq V_w/FR, \tag{15}$$

where FR denotes the frame rate and the equality has changed to an inequality to reflect that FR is a minimum frame rate necessary for the animation effect to work.

Combining Relations 14 and 15 yields, $$(D_i' \times D_{bs})/D_{vs} \leq D_{ff} \leq V_w/FR. \tag{16}$$

$V_w$ and all the distances except $D_{ff}$ are substantially constrained by the environment, and FR is constrained by properties of human visual perception. Therefore the relation defines an allowable range for $D_{ff}$. It also puts a condition on the environments in which the present invention may be applied—i.e., if the inequality does not hold between the far left and far right hand sides of the relation, the present invention will not be useful.

Choosing a lower $D_{ff}$ puts second order frames closer to first order frames while improving the frame rate. Decreasing $D_{ff}$ also increases the transmission fraction without decreasing the resolution. Choosing a higher $D_{ff}$ moves the images farther apart at the expense of a reduced frame rate.

Though in principle apparatus 10 requires no included light source for its operation if ambient light is sufficient, such as outdoors (lid 21 or backboard 23 would have to be light-transmissive), in practice the use of very thin slits does impose such a requirement. That is, when operated under conditions of low ambient light and desiring moderate resolution, bright interior illumination is preferable. The designation "interior" indicates the volume of the apparatus 10 between backboard 23 and slitboard 22, as opposed to the "exterior," which is every place else. The interior will contain the viewable images 230, but otherwise may be empty or contain support structure, illumination sources, optical baffles, etc. as described above in connection with FIGS. 1, 2 and 2A.

Moreover, this illumination preferably should not illuminate the exterior of the device, or illuminate the viewer's environment or reach the viewer directly, because greater contrast between the dark exterior and bright interior improves the appearance of the final image. This lighting requirement is less cumbersome than that for stroboscopic devices—in a subway tunnel environment, this illumination need not be brighter than achievable with ordinary residential/commercial type lighting, such as fluorescent tubes. The lighting preferably should be constant, so no timing complications arise. Preferably the interior of apparatus 10 should be physically sealed as well as possible from the exterior subway tunnel environment as discussed above, preferably while permitting dissipation of heat from the light source, if necessary. The enclosure may also be used to aid the illumination of the interior by reflecting light which would otherwise not be directed towards viewable images 230.

Two examples show in more detail how the various parameters interrelate.

EXAMPLE 1

The first example illustrates how all constraints tend to relax as $V_w$ increases. For example, in a typical subway system the following parameters may be imposed:

$V_w \approx 30$ mph (train speed)

$D_{bs} \approx 6$ inches (space between train and wall)

$D_{vs} \approx 6$ feet (half the width of a train, for the average location of a viewer 30 within the car)

$D_i' \approx 3$ feet (width of train window)

By Relations (3) and (1), $$D_{ff} \geq D_i \geq (D_i' \times D_{bs})/D_{vs} \geq (3 \text{ ft} \times 0.5 \text{ ft})/6 \text{ ft} \geq 0.25 \text{ feet}. \tag{17}$$

If the images are abutted so that $D_{ff}=D_i$, the maximum frame rate is attained. Then, by Relation (2), $$\text{Frame rate}=30 \text{ mph}/0.25 \text{ ft}=176 \text{ frames per second}. \tag{18}$$

At this rate the parameters can be adjusted a great deal while still maintaining high quality animation. This frame rate is also high enough to support interlacing of images (see above) if desired, despite the reduction in effective frame rate that results from interlacing.

EXAMPLE 2

The second example illustrates how the constraints tighten when near the minimal frame rate. To find the lowest practicable $V_w$, assume the following parameters:

frame rate$\approx$20 frames/sec $D_{bs} \approx 6$ inch $D_{vs} \approx 6$ feet $D_i' \approx 2$ feet.

By Relation (1), $$D_i=(D_{bs} \times D_i')/D_{vs}=(0.5 \text{ ft} \times 2 \text{ ft})/6 \text{ ft}=2 \text{ inches}.$$

For abutted images, $D_{ff}=D_i$, and, $$V_w=D_{ff} \times \text{frame rate}=2 \text{ inches} \times 20 \text{ frames/sec}=40 \text{ inches/sec},$$

which is approximately pedestrian footspeed.

The implication of this last result—that the device can successfully display quality animations to pedestrian traffic—vastly increases the potential applicability of this device relative to stroboscopically based arrangements.

The following alternative preferred embodiments are within the spirit and scope of the invention.

FIG. 8 illustrates another preferred embodiment 80 altering the optimal viewing angle of the animation. In apparatus 80, backboard 83 bears images 830 that are inclined at an acute angle to backboard 83, varying the viewing angle from a right angle to that acute angle. This alteration permits more natural viewing for a pedestrian, for example, by not requiring turning of the pedestrian's head far away from the direction of motion. This embodiment may also eliminate second order images.

Figure 9:
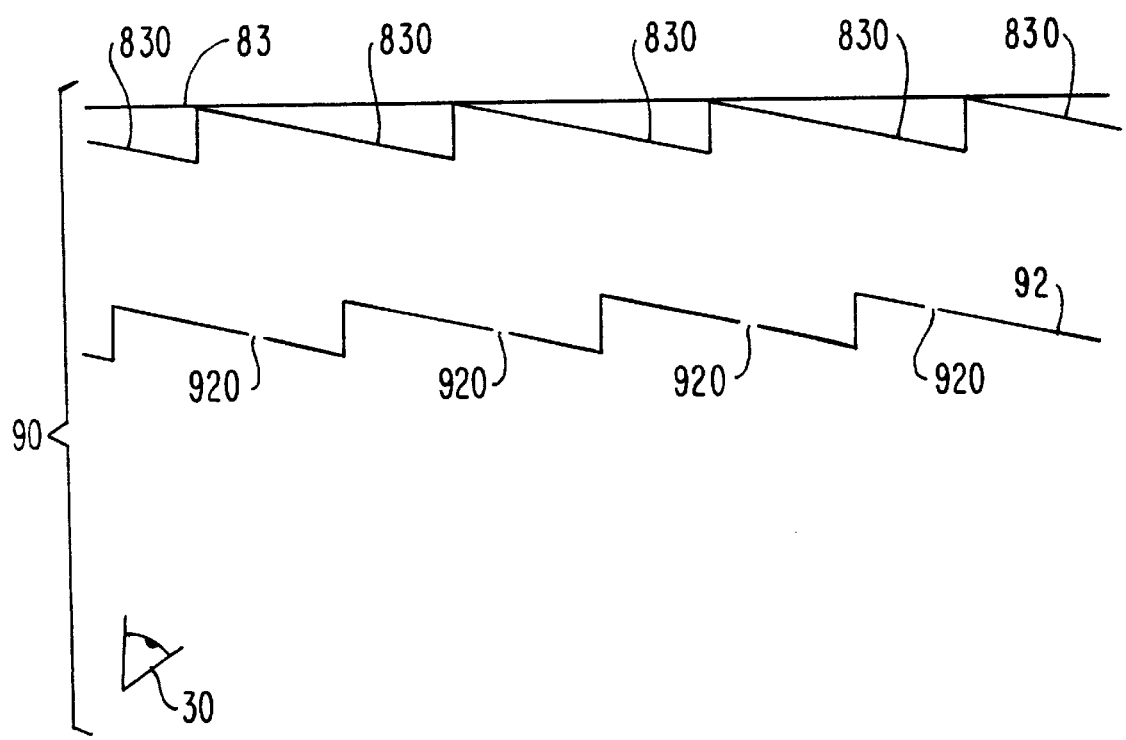
FIG. 9 is a schematic plan view of a fourth preferred embodiment of the invention, similar to the embodiment of FIG. 8, but wherein the slitboard includes a series of sections parallel to the images and inclined relative to the backboard.

FIG. 9 illustrates a further preferred embodiment 90 similar to apparatus 80, but in which slitboard 92 is also angled. This refinement again provides a more natural viewing position for a pedestrian. The asymmetric triangular design permits natural viewing for viewers moving from left to right. A symmetric design (not shown), in which the plan of the slitboard might more resemble, for example, a series of isosceles triangles, could accommodate viewers moving in both directions.

Figure 10:
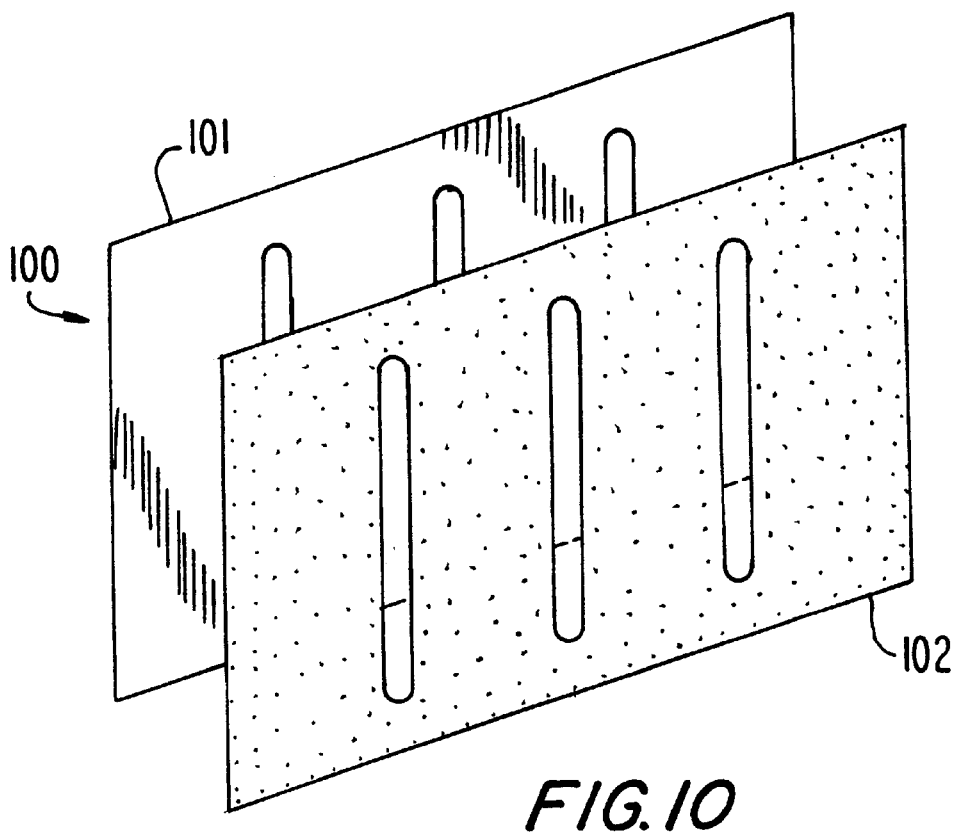
FIG. 10 is a schematic perspective representation of a pair of combination slitboard/backboards from a fifth preferred embodiment of the invention which is two-sided.

FIG. 10 illustrates a technique of using one slitboard 101 as the backboard of a different slitboard 102, while simultaneously using that slitboard 102 as the backboard of the original slitboard 101. This configuration permits the back-to-back installation of two devices in the space of one. This apparatus 100 may be improved by offsetting one set of slits from the other by $D_f/2$, or some fraction of $D_f$.

Figure 11:
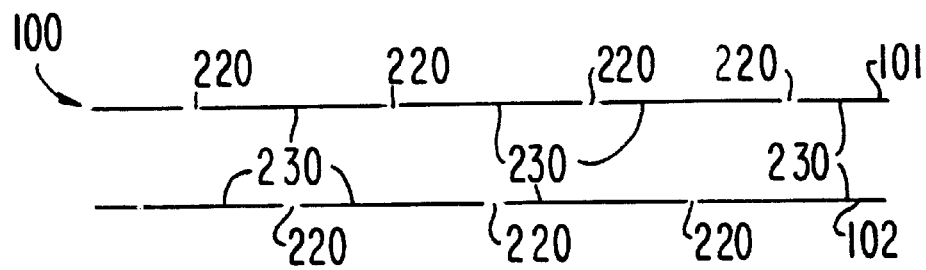
FIG. 11 is a schematic plan view of the embodiment of FIG. 10.

FIG. 11 shows a simple schematic plan view of apparatus 100. Slits 220 of one slitboard 101 are centered between slits 220 of the opposite slitboard 102, which is acting as the former slitboard's backboard. That is, between slits 220 of one slitboard are images 230 viewable through the other slitboard, and vice-versa. Because the slits are very thin, their presence in the backboard creates negligible distraction.

Figure 12:
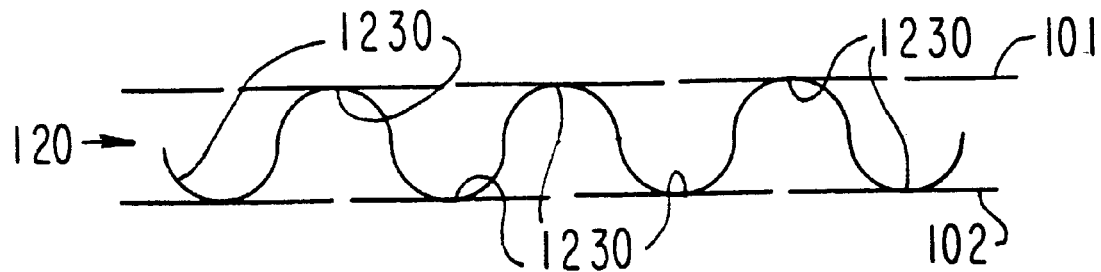
FIG. 12 is a schematic plan view of a sixth embodiment having curved images such as in the embodiment of FIG. 7, and being two-sided such as in the embodiment of FIGS. 10 and 11.

FIG. 12 shows another embodiment 120 similar to apparatus 100, but having a set of curved images 1230 (as in FIG. 7) facing slits 220 of opposite slitboards/backboards 101, 102. Apparatus 120 thus has characteristics, and advantages, of both apparatus 70 and apparatus 100.

Figure 13:
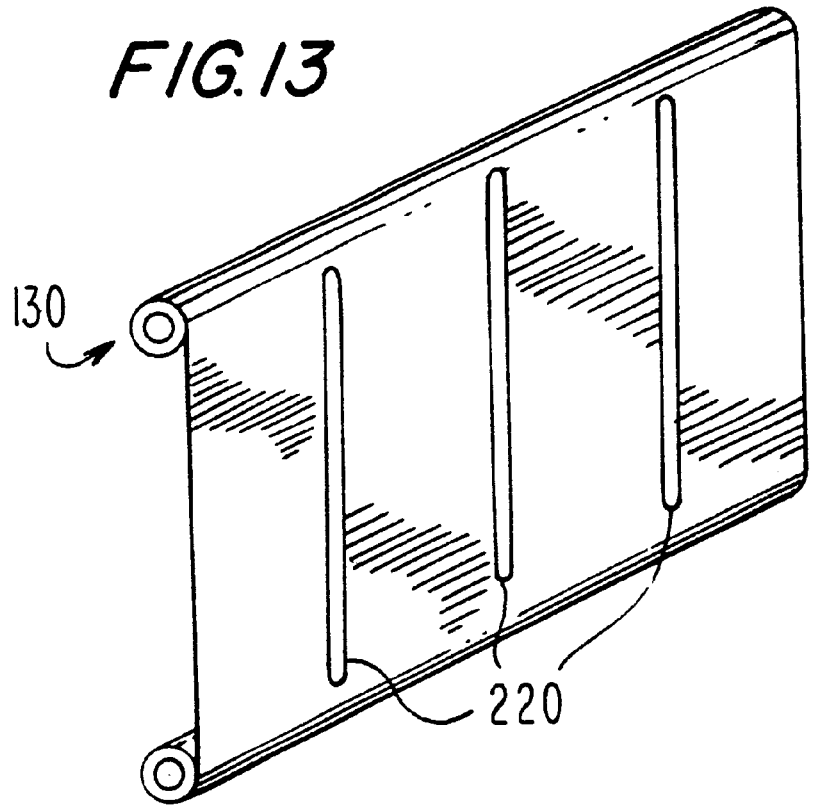
FIG. 13 is a perspective view of a roller-type image holder for use in a seventh preferred embodiment of the invention.

FIG. 13 illustrates a roller type of image display mechanism 130 that may be placed at the position of the backboard. The rollers may contain a plurality of sets of images that can be changed by simply rolling from one set of images to another. Such a mechanism allows the changing of images to be greatly simplified. In order to change from one animation to another, instead of manually changing each image, one may roll such rollers to a different set of images. This change could be performed manually or automatically, for instance by a timer. By incorporating slits 220, mechanism 130 can be used in apparatus 100 or apparatus 120.

Yet another preferred embodiment 140 is shown in FIGS. 14 and 15. In apparatus 140, "backboard" 141, with its images 142, is placed between viewer 30 and a series of mirrors 143. Each mirror 143 preferably is substantially the same size and orientation as any slits that would have been used in the aforementioned embodiments. Mirrors 143 preferably are mounted on a board 144 that takes the place of the slitboard, but mirrors 143 could be mounted individually or on any other suitable mounting. The principles of operation of apparatus 140 are substantially the same as those for the aforementioned embodiments. However, because "backboard" 141 would obscure the sight of mirrors 143 by viewer 30, "backboard" 141 may be placed above or below the line of sight of viewer 30. As shown in FIGS. 14 and 15, "backboard" 141 is above the line of sight of viewer 30. As drawn in FIGS. 14 and 15, moreover, both "backboard" 141 and "mirrorboard" 144 are inclined. However, with proper placement, inclination of boards 141, 144 may not be necessary. As in the case of a slitboard, "mirrorboard" 144 will work best when its non-mirror portions are dark, to increase the contrast with the images.

A complete animation displayed using the apparatus of the present invention for use in a subway system may be a sizable fraction of a mile (or more) in length. In accordance with another aspect of the invention, such an animation can be implemented by breaking the backboard carrying the images for such an animation into smaller units, providing multiple apparatus according to the invention to match the local design of the subway tunnel structure where feasible. Many subway systems have repeating support structure along the length of a tunnel to which such modular devices may be attached in a mechanically simplified way.

As an example, the New York City subway system has throughout its tunnel network regularly spaced columns of support I-beams between many pairs of tracks. Installation of apparatus according to the present invention may be greatly facilitated by taking advantage of these I-beams, their regular spacing, and the certainty of their placement just alongside, but out of, the path of the trains. However, this single example should not be construed as restricting the applicability to just one subway system.

The modularization technique has many other advantages. It has the potential to facilitate construction and maintenance, by taking advantage of structures explicitly designed with the engineering of the subway tunnels in mind. The I-beam structure is sturdy and guaranteed not to encroach on track space. The constant size of the I-beams consistently regulates $D_{bs}$, easing design considerations. Additionally, cost and engineering difficulties are reduced insofar as the apparatus may be easily attached to the exterior of the supports without drilling or possibly destructive alterations to existing structure.

Figure 16:
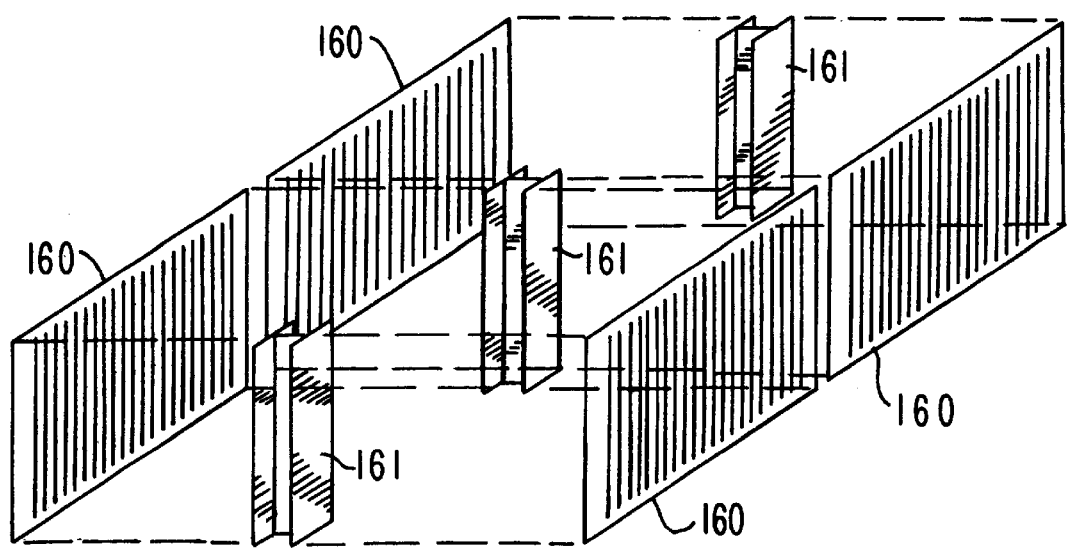
FIG. 16 is a simplified perspective view showing the mounting of a plurality of modular units according the invention in a subway tunnel.

FIG. 16 schematically illustrates an example of the modularization possible for the two-sided apparatus of FIGS. 10 and 11. As shown, construction of the whole length of two slitboards, which could be a half mile or more in length, is reduced to constructing many identical slitboards 160, each about as long as the distance between adjacent I-beam columns 161 (e.g., about five feet). Each of the slitboards is then attached to a pair of the existing support I-beams, along with the other parts of the apparatus as described above.

Thus it is seen that display devices for use in spatially-constrained environments that display still images appearing animated to viewers in motion are provided. One skilled in the art will appreciate that the present invention can be practiced by other than the described embodiments, which are presented for purposes of illustration and not of limitation, and the present invention is limited only by the claims which follow.

What is claimed is:

1. Apparatus for displaying a plurality of still images, forming an animated display, to a viewer moving substantially at a known velocity relative to said still images substantially along a known trajectory substantially parallel to said still images, said apparatus comprising:

a backboard having a backboard length along said trajectory, said still images being mounted on a surface of said backboard, each of said still images having an actual image width and having an image center, image centers of adjacent images being separated by a frame-to-frame distance; and a slitboard positioned substantially parallel to said backboard, facing said surface thereof and separated therefrom by a board-to-board distance, said slitboard being mounted at a viewing distance from said trajectory, said board-to-board distance and said viewing distance totaling a backboard distance, said slitboard having a slitboard length along said trajectory, and having a plurality of slits substantially perpendicular to said slitboard length, each said slit corresponding to one of said images and having a slit width measured along said slitboard length and a slit center, respective slit centers of adjacent ones of said slits being separated by said frame-to-frame distance; wherein:

in order to display each said image with an apparent image width, said board-to-board distance, said viewing distance and said actual image width are selected so that the product of (a) said actual image width and (b) the quotient of (i) said viewing distance and (ii) said board-to-board distance substantially equals said apparent image width;

in order to project each said image substantially without blurring, said slit width is selected to be at most about one-tenth of said actual image width;

said images are illuminated to an image luminance; and when said viewer is in an environment illuminated to an ambient luminance, said slit width is at least about equal to one-tenth the product of (a) said actual image width, (b) the square of the quotient of said backboard distance and said viewing distance, and (c) the quotient of said ambient luminance and said image luminance.

2. The apparatus of claim 1 wherein said slit width is at least about equal to the product of (a) said actual image width, (b) the square of the quotient of said backboard distance and said viewing distance, and (c) the quotient of said ambient luminance and said image luminance.

3. The apparatus of claim 1 further comprising a light source for illuminating said images to said image luminance.

4. The apparatus of claim 3 wherein said light source is between said slitboard and said backboard.

5. The apparatus of claim 3 wherein:

said backboard is light-transmissive; and said backboard is between said light source and said slitboard.

6. Apparatus for displaying a plurality of still images, forming an animated display, to a viewer moving substantially at a known velocity relative to said still images substantially along a known trajectory substantially parallel to said still images, said apparatus comprising:

a backboard having a backboard length along said trajectory, said still images being mounted on a surface of said backboard, each of said still images having an actual image width and having an image center, image centers of adjacent images being separated by a frame-to-frame distance;

a slitboard positioned substantially parallel to said backboard, facing said surface thereof and separated therefrom by a board-to-board distance, said slitboard being mounted at a viewing distance from said trajectory, said board-to-board distance and said viewing distance totaling a backboard distance, said slitboard having a slitboard length along said trajectory, and having a plurality of slits substantially perpendicular to said slitboard length, each said slit corresponding to one of said images and having a slit width measured along said slitboard length and a slit center, respective slit centers of adjacent ones of said slits being separated by said frame-to-frame distance; and a substantially cylindrical lens in each said slit; wherein:

in order to display each said image with an apparent image width, said board-to-board distance, said viewing distance and said actual image width are selected so that the product of (a) said actual image width and (b) the quotient of (i) said viewing distance and (ii) said board-to-board distance substantially equals said apparent image width;

in order to project each said image substantially without blurring, said slit width is selected to be at most about one-tenth of said actual image width.

7. Apparatus for displaying a plurality of still images, forming an animated display, to a viewer moving substantially at a known velocity relative to said still images substantially along a known trajectory substantially parallel to said still images, said apparatus comprising:

a backboard having a backboard length along said trajectory, said still images being mounted on a surface of said backboard, each of said still images having an actual image width and having an image center, image centers of adjacent images being separated by a frame-to-frame distance; and a slitboard positioned substantially parallel to said backboard, facing said surface thereof and separated therefrom by a board-to-board distance, said slitboard being mounted at a viewing distance from said trajectory, said board-to-board distance and said viewing distance totaling a backboard distance, said slitboard having a slitboard length along said trajectory, and having a plurality of slits substantially perpendicular to said slitboard length, each said slit corresponding to one of said images and having a slit width measured along said slitboard length and a slit center, respective slit centers of adjacent ones of said slits being separated by said frame-to-frame distance; wherein:

in order to display each said image with an apparent image width, said board-to-board distance, said viewing distance and said actual image width are selected so that the product of (a) said actual image width and (b) the quotient of (i) said viewing distance and (ii) said board-to-board distance substantially equals said apparent image width;

in order to project each said image substantially without blurring, said slit width is selected to be at most about one-tenth of said actual image width; and said trajectory, said backboard and said slitboard are curved.

8. Apparatus for displaying a plurality of still images, forming an animated display, to a viewer moving substantially at a known velocity relative to said still images substantially along a known trajectory substantially parallel to said still images, said apparatus comprising:

a backboard having a backboard length along said trajectory, said still images being mounted on a surface of said backboard, each of said still images having an actual image width and having an image center, image centers of adjacent images being separated by a frame-to-frame distance; and a slitboard positioned substantially parallel to said backboard, facing said surface thereof and separated therefrom by a board-to-board distance, said slitboard being mounted at a viewing distance from said trajectory, said board-to-board distance and said viewing distance totaling a backboard distance, said slitboard having a slitboard length along said trajectory, and having a plurality of slits substantially perpendicular to said slitboard length, each said slit corresponding to one of said images and having a slit width measured along said slitboard length and a slit center, respective slit centers of adjacent ones of said slits being separated by said frame-to-frame distance; wherein:

in order to display each said image with an apparent image width, said board-to-board distance, said viewing distance and said actual image width are selected so that the product of (a) said actual image width and (b) the quotient of (i) said viewing distance and (ii) said board-to-board distance substantially equals said apparent image width;

in order to project each said image substantially without blurring, said slit width is selected to be at most about one-tenth of said actual image width; and only one of said images is visible through said slitboard at any one time.

9. The apparatus of claim 8 further comprising a plurality of baffles, each of said baffles extending from said slitboard to said backboard between respective adjacent ones of said images.

10. Apparatus for displaying a plurality of still images, forming an animated display, to a viewer moving substantially at a known velocity relative to said still images substantially along a known trajectory substantially parallel to said still images, said apparatus comprising:

a backboard having a backboard length along said trajectory, said still images being mounted on a surface of said backboard, each of said still images having an actual image width and having an image center, image centers of adjacent images being separated by a frame-to-frame distance;

a slitboard positioned substantially parallel to said backboard, facing said surface thereof and separated therefrom by a board-to-board distance, said slitboard being mounted at a viewing distance from said trajectory, said board-to-board distance and said viewing distance totaling a backboard distance, said slitboard having a slitboard length along said trajectory, and having a plurality of slits substantially perpendicular to said slitboard length, each said slit corresponding to one of said images and having a slit width measured along said slitboard length and a slit center, respective slit centers of adjacent ones of said slits being separated by said frame-to-frame distance; and an enclosure for preventing entry of foreign matter between said slitboard and said backboard; wherein:

in order to display each said image with an apparent image width, said board-to-board distance, said viewing distance and said actual image width are selected so that the product of (a) said actual image width and (b) the quotient of (i) said viewing distance and (ii) said board-to-board distance substantially equals said apparent image width;

in order to project each said image substantially without blurring, said slit width is selected to be at most about one-tenth of said actual image width.

11. The apparatus of claim 10 wherein said slitboard and said backboard form portions of said enclosure.

12. The apparatus of claim 11 further comprising a respective transparent coverings for each said slit.

13. The apparatus of claim 10 wherein:

said slitboard and said backboard are within said enclosure; and said enclosure has a maintenance door through which said backboard is changed.

14. Apparatus for displaying a plurality of still images, forming an animated display, to a viewer moving substantially at a known velocity relative to said still images substantially along a known trajectory substantially parallel to said still images, said apparatus comprising:

a backboard having a backboard length along said trajectory, said still images being mounted on a surface of said backboard, each of said still images having an actual image width and having an image center, image centers of adjacent images being separated by a frame-to-frame distance; and a slitboard positioned substantially parallel to said backboard, facing said surface thereof and separated therefrom by a board-to-board distance, said slitboard being mounted at a viewing distance from said trajectory, said board-to-board distance and said viewing distance totaling a backboard distance, said slitboard having a slitboard length along said trajectory, and having a plurality of slits substantially perpendicular to said slitboard length, each said slit corresponding to one of said images and having a slit width measured along said slitboard length and a slit center, respective slit centers of adjacent ones of said slits being separated by said frame-to-frame distance; wherein:

in order to display each said image with an apparent image width, said board-to-board distance, said viewing distance and said actual image width are selected so that the product of (a) said actual image width and (b) the quotient of (i) said viewing distance and (ii) said board-to-board distance substantially equals said apparent image width;

in order to project each said image substantially without blurring, said slit width is selected to be at most about one-tenth of said actual image width; and said frame-to-frame distance is selected with regard to said known velocity to produce a desired frame rate to be seen by said viewer, said frame rate being at least about 15 frames per second.

15. The apparatus of claim 14 wherein said images are curved relative to said backboard and said slitboard.

16. The apparatus of claim 14 wherein said images are inclined relative to said backboard and said slitboard.

17. The apparatus of claim 14 wherein said known trajectory is a subway track, said viewer being a passenger on a subway train travelling on said subway track.

18. The apparatus of claim 14 wherein said known trajectory is a walkway, said viewer being a pedestrian on said walkway.

19. Apparatus for displaying a plurality of still images, forming an animated display, to a viewer moving substantially at a known velocity relative to said still images substantially along a known trajectory substantially parallel to said still images, said apparatus comprising:

a backboard having a backboard length along said trajectory, said still images being mounted on a surface of said backboard, each of said still images having an actual image width and having an image center, image centers of adjacent images being separated by a frame-to-frame distance; and a slitboard positioned substantially parallel to said backboard, facing said surface thereof and separated therefrom by a board-to-board distance, said slitboard being mounted at a viewing distance from said trajectory, said board-to-board distance and said viewing distance totaling a backboard distance, said slitboard having a slitboard length along said trajectory, and having a plurality of slits substantially perpendicular to said slitboard length, each said slit corresponding to one of said images and having a slit width measured along said slitboard length and a slit center, respective slit centers of adjacent ones of said slits being separated by said frame-to-frame distance; wherein:

in order to display each said image with an apparent image width, said board-to-board distance, said viewing distance and said actual image width are selected so that the product of (a) said actual image width and (b) the quotient of (i) said viewing distance and (ii) said board-to-board distance substantially equals said apparent image width;

in order to project each said image substantially without blurring, said slit width is selected to be at most about one-tenth of said actual image width; and each of said slit centers is directly opposite a respective one of said image centers.

20. Apparatus for displaying a plurality of still images, forming an animated display, to a viewer moving substantially at a known velocity relative to said still images substantially along a known trajectory substantially parallel to said still images, said apparatus comprising:

a backboard having a backboard length along said trajectory, said still images being mounted on a surface of said backboard, each of said still images having an actual image width and having an image center, image centers of adjacent images being separated by a frame-to-frame distance; and an optical arrangement positioned to transmit light from said images to said viewer along said trajectory, said optical arrangement having optical elements viewed by said viewer at a viewing distance from said trajectory, each respective one of said optical elements being at an optical distance from a respective one of said images and having an element width measured parallel to said trajectory and an element center along said width, respective element centers of adjacent ones of said elements being separated by said frame-to-frame distance; wherein:

in order to display each said image with an apparent image width, said optical distance, said viewing distance and said actual image width are selected so that the product of (a) said actual image width and (b) the quotient of (i) said viewing distance and (ii) said optical distance substantially equals said apparent image width;

in order to project each said image substantially without blurring, said element width is selected to be at most about one-tenth of said actual image width;

said images are illuminated to an image luminance; and when said viewer is in an environment illuminated to an ambient luminance, said element width is at least about equal to one-tenth the product of (a) said actual image width, (b) the square of the quotient of (i) the sum of said viewing distance and said optical distance and (ii) said viewing distance, and (c) the quotient of said ambient luminance and said image luminance.

21. Apparatus for displaying a plurality of still images, forming an animated display, to a viewer moving substantially at a known velocity relative to said still images substantially along a known trajectory substantially parallel to said still images, said apparatus comprising:

a backboard having a backboard length along said trajectory, said still images being mounted on a surface of said backboard, each of said still images having an actual image width and having an image center, image centers of adjacent images being separated by a frame-to-frame distance; and an optical arrangement positioned to transmit light from said images to said viewer along said trajectory, said optical arrangement having optical elements viewed by said viewer at a viewing distance from said trajectory, each respective one of said optical elements being at an optical distance from a respective one of said images and having an element width measured parallel to said trajectory and an element center along said width, respective element centers of adjacent ones of said elements being separated by said frame-to-frame distance; wherein:

in order to display each said image with an apparent image width, said optical distance, said viewing distance and said actual image width are selected so that the product of (a) said actual image width and (b) the quotient of (i) said viewing distance and (ii) said optical distance substantially equals said apparent image width;

in order to project each said image substantially without blurring, said element width is selected to be at most about one-tenth of said actual image width;

said images are illuminated to an image luminance; and when said viewer is in an environment illuminated to an ambient luminance, said element width is at least about equal to the product of (a) said actual image width, (b) the square of the quotient of (i) the sum of said viewing distance and said optical distance and (ii) said viewing distance, and (c) the quotient of said ambient luminance and said image luminance.

22. Apparatus for displaying a plurality of still images, forming an animated display, to a viewer moving substantially at a known velocity relative to said still images substantially along a known trajectory substantially parallel to said still images, said apparatus comprising:

a backboard having a back board length along said trajectory, said still images being mounted on a surface of said backboard, each of said still images having an actual image width and having an image center, image centers of adjacent images being separated by a frame-to-frame distance; and an optical arrangement positioned to transmit light from said images to said viewer along said trajectory, said optical arrangement having optical elements viewed by said viewer at a viewing distance from said trajectory, each respective one of said optical elements being at an optical distance from a respective one of said images and having an element width measured parallel to said trajectory and an element center along said width, respective element centers of adjacent ones of said elements being separated by said frame-to-frame distance; wherein:

in order to display each said image with an apparent image width, said optical distance, said viewing distance and said actual image width are selected so that the product of (a) said actual image width and (b) the quotient of (i) said viewing distance and (ii) said optical distance substantially equals said apparent image width;

in order to project each said image substantially without blurring, said element width is selected to be at most about one-tenth of said actual image width; and said optical arrangement is a slitboard positioned substantially parallel to said backboard, facing said surface thereof and separated therefrom by a board-to-board distance, said slitboard being mounted at said viewing distance from said trajectory, said slitboard having a slitboard length along said trajectory, said optical elements being slits substantially perpendicular to said slitboard length.

23. Apparatus for displaying a plurality of still images, forming an animated display, to a viewer moving substantially at a known velocity relative to said still images substantially along a known trajectory substantially parallel to said still images, said apparatus comprising:

a backboard having a backboard length along said trajectory, said still images being mounted on a surface of said backboard, each of said still images having an actual image width and having an image center, image centers of adjacent images being separated by a frame-to-frame distance; and an optical arrangement positioned to transmit light from said images to said viewer along said trajectory, said optical arrangement having optical elements viewed by said viewer at a viewing distance from said trajectory, each respective one of said optical elements being at an optical distance from a respective one of said images and having an element width measured parallel to said trajectory and an element center along said width, respective element centers of adjacent ones of said elements being separated by said frame-to-frame distance; wherein:

in order to display each said image with an apparent image width, said optical distance, said viewing distance and said actual image width are selected so that the product of (a) said actual image width and (b) the quotient of (i) said viewing distance and (ii) said optical distance substantially equals said apparent image width;

in order to project each said image substantially without blurring, said element width is selected to be at most about one-tenth of said actual image width;

said surface of said backboard faces away from said trajectory; and each of said optical elements is a mirror.

* * * * *

UNITED STATES PATENT AND TRADEMARK OFFICE
CERTIFICATE OF CORRECTION

PATENT NO.   : 6,564,486 B1
DATED        : May 20, 2003
INVENTOR(S)  : Joshua D. Spodek et al.

It is certified that error appears in the above-identified patent and that said Letters Patent is hereby corrected as shown below:

<u>Title page,</u>
Item [56], References Cited, FOREIGN PATENT DOCUMENTS, change "EP 393 2443" to -- EP 393 243 --.

<u>Column 2,</u>
Line 27, change "eight" to -- height --.

<u>Column 3,</u>
Line 13, change "TE" to -- THE --.

<u>Column 5,</u>
Line 13, delete the period after "viewer's".

<u>Column 7,</u>
Line 38, change "represent's" to -- represents --.

<u>Column 8,</u>
Line 36, change "Di," to -- Di', --.

<u>Column 10,</u>
Line 27, delete the period after "are";
Line 33, change "similarly" to -- Similarly --;
Line 56, delete the period after "apparatus"; and
Line 66, delete the period after "the".

<u>Column 11,</u>
Line 26, change "Di," to -- Di', --.

<u>Column 12,</u>
Line 31, change "Ds 1/B" to -- $Ds \propto 1/B$ --.

<u>Column 14,</u>
Line 55, change "Dvs > c" to -- $Dvs \geq c$ --.

UNITED STATES PATENT AND TRADEMARK OFFICE
CERTIFICATE OF CORRECTION

PATENT NO. : 6,564,486 B1
DATED : May 20, 2003
INVENTOR(S) : Joshua D. Spodek et al.

It is certified that error appears in the above-identified patent and that said Letters Patent is hereby corrected as shown below:

<u>Column 15,</u>
Line 10, change "Ds," to -- Ds --.

<u>Column 24,</u>
Line 22, change "back board" to -- backboard --.

Signed and Sealed this

Thirtieth Day of March, 2004

JON W. DUDAS
*Acting Director of the United States Patent and Trademark Office*